United States Patent [19]
Sako et al.

[11] Patent Number: 5,781,565
[45] Date of Patent: Jul. 14, 1998

[54] DATA RECORDING/REPRODUCING METHOD, DATA REPRODUCING APPARATUS AND RECORDING MEDIUM

[75] Inventors: Yoichiro Sako, Chiba; Tamotsu Yamagami; Satoshi Otsuka, both of Kanagawa; Minoru Tobita, Tokyo, all of Japan

[73] Assignee: Sony Corporation, Tokyo, Japan

[21] Appl. No.: 637,798

[22] PCT Filed: Sep. 6, 1995

[86] PCT No.: PCT/JP95/01766

§ 371 Date: May 8, 1996

§ 102(e) Date: May 8, 1996

[87] PCT Pub. No.: WO96/08010

PCT Pub. Date: Mar. 14, 1996

[30] Foreign Application Priority Data

Sep. 9, 1994 [JP] Japan .................. 6-216315

[51] Int. Cl.$^6$ .................................. G11B 20/18
[52] U.S. Cl. .................. 371/37.4; 371/37.7; 371/40.14
[58] Field of Search .................. 371/37.4, 37.7, 371/40.14, 40.4

[56] References Cited

U.S. PATENT DOCUMENTS

| | | | |
|---|---|---|---|
| 4,680,764 | 7/1987 | Suzuki et al. | 371/37.5 |
| 4,750,178 | 6/1988 | Sako et al. | 371/37.4 |
| 4,819,236 | 4/1989 | Sako et al. | 371/37.4 |
| 5,060,221 | 10/1991 | Sako et al. | 369/59 |
| 5,216,656 | 6/1993 | Sako et al. | 369/59 |
| 5,455,814 | 10/1995 | Sako | 369/59 |
| 5,517,477 | 5/1996 | Sako | 369/60 |

*Primary Examiner*—Stephen M. Baker
*Attorney, Agent, or Firm*—Limbach & Limbach L.L.P.

[57] ABSTRACT

When data is recorded on a recording medium such as an optical disk and reproduced, if burst error occurs, the processing can be carried out efficiently and satisfactory reproduction can be carried out without lessening a data recording capacity. When data is recorded, a first error-correcting code is generated with respect to a series of data of a predetermined amount. The first error-correcting code is added to data of the predetermined amount from which the first error-correcting code is generated. A second error-correcting code is generated with respect to a series of data of the predetermined amount. The second error-correcting code is added to data other than data of the predetermined amount from which the second error-correcting code is generated and then recorded on a recording medium. Upon reproduction, data of a certain recording unit is reproduced from a recording medium on which data of respective recording units are recorded. It is determined on the basis of the first error-correcting code contained in reproduced data of recording units whether errors can be detected and corrected. If the errors can be detected and corrected, then the errors can be detected and corrected. If the errors cannot be detected and corrected, then erasure information is generated on the basis of the second error-correcting code corresponding to the data of a certain recording unit reproduced from the recording unit which contains the second error-correcting code concerning the data of a certain recording unit and the data of a certain recording unit is erased and corrected by use of the erasure information and the first error-correcting code.

24 Claims, 17 Drawing Sheets

FIG. 5

| NAME OF REGION | STARTING RADIUS(mm) | ENDING RADIUS(mm) | DATA CLOCK |
|---|---|---|---|
| GCP REGION | 41.9980mm | 41.2180mm | 24.192MHz |
| CONTROL REGION | 41.2144mm | 41.2096mm | 24.192MHz |
| TEST REGION | 41.2060mm | 41.2012mm | 24.192MHz |
| BAND0 | 41.2000mm | 41.1836mm | 24.192MHz |
| BAND1 | 39.1824mm | 39.1468mm | 23.688MHz |
| BAND2 | 38.1456mm | 38.0908mm | 23.184MHz |
| BAND3 | 37.0896mm | 36.9964mm | 22.680MHz |
| BAND4 | 36.9952mm | 35.8636mm | 21.672MHz |
| BAND5 | 35.8624mm | 34.6924mm | 21.168MHz |
| BAND6 | 34.6912mm | 33.4636mm | 20.160MHz |
| BAND7 | 33.4624mm | 32.1964mm | 19.656MHz |
| BAND8 | 32.1952mm | 30.8524mm | 18.648MHz |
| BAND9 | 30.8512mm | 29.4316mm | 17.640MHz |
| BAND10 | 29.4304mm | 27.9724mm | 17.136MHz |
| BAND11 | 27.9712mm | 26.4172mm | 16.128MHz |
| BAND12 | 26.4160mm | 24.7468mm | 15.120MHz |
| BAND13 | 24.7456mm | 22.9612mm | 14.112MHz |
| BAND14 | 22.9600mm | 20.9260mm | 12.600MHz |
| BAND15 | 20.9248mm | 20.0020mm | 12.096MHz |
| TEST REGION | 20.0008mm | 19.9960mm | 12.096MHz |
| CONTROL REGION | 19.9924mm | 19.9876mm | 12.096MHz |
| GCP REGION | 19.9840mm | 19.0000mm | 12.096MHz |

FIG. 6A

| i \ j | 0 | 1 | ... 7 | 8 | 9 | 10 | 11 | 12 | 13 | 14 | 15 |
|---|---|---|---|---|---|---|---|---|---|---|---|
| 130 | D0 | D1 | D7 | D8 | D9 | D10 | D11 | D12 | D13 | D14 | D15 |
| 129 | D16 | D17 | D23 | D24 | D25 | D26 | D27 | D28 | D29 | D30 | D31 |
| 128 | D32 | D33 | D39 | D40 | D41 | D42 | D43 | D44 | D45 | D46 | D47 |
| 127 | D48 | D49 | D55 | D56 | D57 | D58 | D59 | D60 | D61 | D62 | D63 |
| 126 | D64 | D65 | D71 | D72 | D73 | D74 | D75 | D76 | D77 | D78 | D79 |
| 125 | D80 | D81 | D87 | D88 | D89 | D90 | D91 | D92 | D93 | D94 | D95 |
| 124 | D96 | D97 | D103 | D104 | D105 | D106 | D107 | D108 | D109 | D110 | D111 |
| 123 | D112 | D113 | D119 | D120 | D121 | D121 | D123 | D124 | D125 | D126 | D127 |

147 LINES

FIG. 6B

| j \ i | 0 | 1 | ... | 7 | 8 | 9 | 10 | 11 | 12 | 13 | 14 | 15 |
|---|---|---|---|---|---|---|---|---|---|---|---|---|
| -4 | D2016 | D2017 | | D2023 | D2024 | D2025 | D2026 | D2027 | D2028 | D2029 | D2030 | D2031 |
| -3 | D2032 | D2033 | | D2039 | D2040 | D2041 | D2042 | D2043 | D2044 | D2045 | D2046 | D2047 |
| -2 | P1 | P2 | | P8 | P9 | P10 | P11 | P12 | P13 | P14 | P15 | P16 |
| -1 | P17 | P18 | | P24 | P25 | P26 | P27 | P28 | P29 | P30 | P31 | P32 |
| 0 | P33 | P34 | | Q4 | CRC1 | CRC2 | CRC3 | CRC4 | CRC5 | CRC6 | CRC7 | CRC8 |
| 1 | E1,1 | E2,1 | | E8,1 | E9,1 | E10,1 | E11,1 | E12,1 | E13,1 | E14,1 | E15,1 | E16,1 |
| 2 | E1,2 | E2,2 | | E8,2 | E9,2 | E10,2 | E11,2 | E12,2 | E13,2 | E14,2 | E15,2 | E16,2 |
| 3 | E1,3 | E2,3 | | E8,3 | E9,3 | E10,3 | E11,3 | E12,3 | E13,3 | E14,3 | E15,3 | E16,3 |
| 4 | E1,4 | E2,4 | | E8,4 | E9,4 | E10,4 | E11,4 | E12,4 | E13,4 | E14,4 | E15,4 | E16,4 |

147 LINES

| P1  | P2  | P3  | P4  | P5  | P6  | P7  | P8  | P9  | P10 | P11 | P12 | P13 | P14 | P15 | P16 |
| P17 | P18 | P19 | P20 | P21 | P22 | P23 | P24 | P25 | P26 | P27 | P28 | P29 | P30 | P31 | P32 |
| P33 | P34 | P35 | P36 | Q1  | Q2  | Q3  | Q4  | CRC1| CRC2| CRC3| CRC4| CRC5| CRC6| CRC7| CRC8|

FIG. 6C

| | -13 | -14 | -15 | -16 | |
|---|---|---|---|---|---|
| | E1,13 | E1,14 | E1,15 | E1,16 | |
| | E2,13 | E2,14 | E2,15 | E2,16 | |
| | ... | ... | ... | ... | |
| | E8,13 | E8,14 | E8,15 | E8,16 | |
| | E9,13 | E9,14 | E9,15 | E9,16 | |
| | E10,13 | E10,14 | E10,15 | E10,16 | |
| | E11,13 | E11,14 | E11,15 | E11,16 | |
| | E12,13 | E12,14 | E12,15 | E12,16 | |
| | E13,13 | E13,14 | E13,15 | E13,16 | |
| | E14,13 | E14,14 | E14,15 | E14,16 | |
| | E15,13 | E15,14 | E15,15 | E15,16 | |
| | E16,13 | E16,14 | E16,15 | E16,16 | |

FIG. 7

| NUMBER OF LINES | DATA | PARITY | |
|---|---|---|---|
| 8 | i = 130~123 | P 1 | P 2 |
| 8 | i = 122~115 | P 3 | P 4 |
| 8 | i = 114~107 | P 5 | P 6 |
| 8 | i = 106~99 | P 7 | P 8 |
| 8 | i = 98~91 | P 9 | P 10 |
| 8 | i = 90~83 | P 11 | P 12 |
| 8 | i = 82~75 | P 13 | P 14 |
| 8 | i = 74~67 | P 15 | P 16 |
| 8 | i = 66~59 | P 17 | P 18 |
| 8 | i = 58~51 | P 19 | P 20 |
| 8 | i = 50~43 | P 21 | P 22 |
| 8 | i = 42~35 | P 23 | P 24 |
| 8 | i = 34~27 | P 25 | P 26 |
| 8 | i = 26~19 | P 27 | P 28 |
| 8 | i = 18~11 | P 29 | P 30 |
| 8 | i = 10~3 | P 31 | P 32 |
| 8 | i = −1~−8 | P 33 | P 34 |
| 8 | i = −9~−16 | P 35 | P 36 |
| | P1~P36 | Q 1 | Q 2 |
| | P1~P36、Q1、Q2 | Q 3 | Q 4 |

FIG. 9

| P1~P36 | Q1 | Q2 | Q3 | Q4 | CRC1 | CRC2 | CRC3 | CRC4 | CRC5 | CRC6 | CRC7 | CRC8 |

FIG. 10

| NUMBER OF LINES | DATA | PARITY | |
|---|---|---|---|
| 8 | i = 130~123 | P 1 | P 2 |
| 8 | i = 122~115 | P 3 | P 4 |
| 8 | i = 114~107 | P 5 | P 6 |
| 8 | i = 106~99 | P 7 | P 8 |
| 8 | i = 98~91 | P 9 | P 10 |
| 8 | i = 90~83 | P 11 | P 12 |
| 8 | i = 82~75 | P 13 | P 14 |
| 8 | i = 74~67 | P 15 | P 16 |
| 8 | i = 66~59 | P 17 | P 18 |
| 8 | i = 58~51 | P 19 | P 20 |
| 8 | i = 50~43 | P 21 | P 22 |
| 8 | i = 42~35 | P 23 | P 24 |
| 8 | i = 34~27 | P 25 | P 26 |
| 8 | i = 26~19 | P 27 | P 28 |
| 8 | i = 18~11 | P 29 | P 30 |
| 8 | i = 10~3 | P 31 | P 32 |
| | P 1~P 32 | Q 1 | Q 2 |
| | | Q 3 | Q 4 |
| | P 1~P 32, Q 1~Q 4 | Q 5 | Q 6 |
| | | Q 7 | Q 8 |

FIG. 14

| NUMBER OF LINES | DATA | PARITY | |
|---|---|---|---|
| 7 | i = 130~124 | P 1 | P 2 |
| 8 | i = 123~116 | P 3 | P 4 |
| 7 | i = 115~109 | P 5 | P 6 |
| 7 | i = 108~102 | P 7 | P 8 |
| 8 | i = 101~94 | P 9 | P 10 |
| 7 | i = 93~87 | P 11 | P 12 |
| 7 | i = 86~80 | P 13 | P 14 |
| 8 | i = 79~72 | P 15 | P 16 |
| 7 | i = 71~65 | P 17 | P 18 |
| 7 | i = 64~58 | P 19 | P 20 |
| 8 | i = 57~50 | P 21 | P 22 |
| 7 | i = 49~43 | P 23 | P 24 |
| 7 | i = 42~36 | P 25 | P 26 |
| 8 | i = 35~28 | P 27 | P 28 |
| 7 | i = 27~21 | P 29 | P 30 |
| 7 | i = 20~14 | P 31 | P 32 |
| 8 | i = 13~6 | P 33 | P 34 |
| 7 | i = 5~-1 | P 35 | P 36 |
| 7 | i = -2~-8 | P 37 | P 38 |
| 8 | i = -9~-16 | P 39 | P 40 |

FIG. 15

| NUMBER OF LINES | DATA | PARITY | |
|---|---|---|---|
| 7 | i=130~124 | P 1 | P 2 |
| 8 | i=123~116 | P 3 | P 4 |
| 7 | i=115~109 | P 5 | P 6 |
| 7 | i=108~102 | P 7 | P 8 |
| 8 | i=101~94 | P 9 | P 10 |
| 7 | i=93~87 | P 11 | P 12 |
| 7 | i=86~80 | P 13 | P 14 |
| 8 | i=79~72 | P 15 | P 16 |
| 7 | i=71~65 | P 17 | P 18 |
| 7 | i=64~58 | P 19 | P 20 |
| 8 | i=57~50 | P 21 | P 22 |
| 7 | i=49~43 | P 23 | P 24 |
| 7 | i=42~36 | P 25 | P 26 |
| 8 | i=35~28 | P 27 | P 28 |
| 7 | i=27~21 | P 29 | P 30 |
| 7 | i=20~14 | P 31 | P 32 |
| 8 | i=13~6 | P 33 | P 34 |
| 3 | i=5~3 | P 35 | P 36 |
| | P1~P36 | Q 1 | Q 2 |
| | P1~P36、Q1、Q2 | Q 3 | Q 4 |

DATA RECORDING/REPRODUCING METHOD, DATA REPRODUCING APPARATUS AND RECORDING MEDIUM

TECHNICAL FIELD

The present invention relates to a data recording/reproducing method, a data reproducing apparatus and a recording medium for use with an optical disk drive or the like, for example.

BACKGROUND ART

A magneto-optical disk, a phase-change type optical disk, a write-once disk and a read-only optical disk are proposed as optical disks. These optical disks are roughly classified as writable disk and read-only disk.

If a defective sector is detected from a magneto-optical disk serving as a rewritable disk by a disk-certify executed when the magneto-optical disk is manufactured, then a sector following the defective sector is used as a replacement sector, which information is recorded on a predetermined area of the magneto-optical disk. Upon reproduction, the replacement sector of the defective sector is used. If a defective sector occurs after the magneto-optical disk has been shipped, then a replacement sector of the defective sector is set in a region exclusively used by the replacement sector of the defective sector. Data that should be recorded on the defective sector is recorded on the replacement sector, which information is recorded on a predetermined area of the magneto-optical disk.

Data cannot be recorded on the read-only optical disk by an optical disk drive. As is well known, when the read-only optical disk is manufactured, data is recorded on the read-only optical disk. After the read-only optical disk has been shipped, data that had been recorded when the read-only optical disk was manufactured, can be read out.

If data is recorded on the magneto-optical disk by the optical disk drive, or data is recorded on the read-only optical disk when the read-only optical disk is manufactured, parity-check codes for error-correction and parity-check codes such as error-checking CRC (cyclic redundancy check) codes are added to data. Therefore, upon reproduction, regardless of the magneto-optical disk and the read-only optical disk, reproduced data is error-checked and error-corrected by the parity-check code.

A known parity-check code forms a Reed-Solomon code. The Reed-Solomon code is n-symbol code where a parity-check code is added to k-symbol data where one symbol is formed of 8 bits and the data is formed of k symbols. An error-correcting capability of an error-correcting code is expressed by minimum distance.

When one symbol is one bit, for example, n symbols are expressed by n bits so that binary data sequences that the n symbols can take are expressed by $2^n$. On the other hand, since $2^k$ data except the parity-check codes are required, $2^k$ data sequences are taken out from the $2^n$ data sequences. When arbitrary two data sequences have different bits of d bits therebetween, where d means a distance, then. Then, a minimum value which results from similarly calculating distances with respect to all $2^k$ data sequences is referred to as a minimum distance. This "minimum distance" will hereinafter be referred to as "distance" for the sake of simplicity.

In general, a distance d of the error-correcting code for error-correcting t1 errors should satisfy the following equation (1):

$$d \geq 2t1+1 \tag{1}$$

When the distance d is 17, for example, t1 becomes 8. That is, errors up to 8 symbols can be corrected.

The above-mentioned parity-check code has not only the error-correcting capability but also error-detecting capability. If the number of errors that can be detected by the error-detecting capability is taken as t2, then the error-detection number t2 is expressed by the following equation (2):

$$t2=d-(2t1+1) \text{ (but } t2 \geq 0) \tag{2}$$

If the distance d, for example, is 17, then the error-correction number t1 and the error-detection number t2 can be expressed by the following table 1.

TABLE 1

| symbols to be corrected | t1 | t2 |
|---|---|---|
| 0 symbol | t1 = 0 | t2 = 16 |
| 1 symbol | t1 = 1 | t2 = 14 |
| 2 symbols | t1 = 2 | t2 = 12 |
| 3 symbols | t1 = 3 | t2 = 10 |
| 4 symbols | t1 = 4 | t2 = 8 |
| 5 symbols | t1 = 5 | t2 = 6 |
| 6 symbols | t1 = 6 | t2 = 4 |
| 7 symbols | t1 = 7 | t2 = 2 |
| 8 symbols | t1 = 8 | t2 = 0 |

Study of the table 1 shows that when 8 symbols are corrected, the error-detected number is "0". Therefore, if errors of 9 symbols or greater occur, there is then the risk that errors cannot be detected correctly. Accordingly, if the distance d is set to a large value, the number of errors that can be corrected is increased and the error-detecting capability also can be maintained. The Reed-Solomon code thus arranged is often referred to as a (n, k, d) LDC (long distance code) because it has relatively large distance d.

In the magneto-optical disk and the read-only disk, if data is recorded thereon after the above-mentioned Reed-Solomon code has been arranged, then upon reproduction, random errors and burst errors of lengths corresponding to the value of the distance d, the error-corrected number t1 and the error-detected number t2 can be corrected.

As is clear from the above equation 1, when the distance d, for example, is 17, the number of errors that can be corrected is 8 at maximum. As a consequence, if burst error wherein 9 data or greater become erroneous consecutively occurs, such burst error cannot be corrected and erroneous data is used as it is.

In the rewritable disk such as the magneto-optical disk, if a defective sector is detected, then data is recorded on a replacement sector by replacement so that data can constantly be reproduced satisfactorily. Furthermore, to solve the problem of burst error, a parity-check code sector is provided over one or a plurality of circumferences of the disk and data which result from calculating data of other sectors of one or a plurality of circumferences of the disk in an exclusive-OR fashion are recorded on the parity-check code sector as the parity-check code. Then, when a burst error occurs, data with such burst error can be corrected on the basis of the parity-check code read out from the parity-check code sector.

However, when the method using the replacement is used, the replacement decreases a processing speed. A low processing speed causes a trouble particularly when data such as moving image data that should be processed in real time is handled. Moreover, when the error-correcting method using the parity-check code sector is used, if a burst error occurs, then data that has been recorded on the area is read out one more time. Then, data has to be error-corrected by use of the data, which is read out one more time, and the parity-check code data. As a result, if the burst error occurs, there is then the problem that a time consumed when errors are corrected will be extended.

On the other hand, in the read-only optical disk, the above-mentioned replacement cannot be executed so that, when large errors such as burst errors occur, such large errors have to be corrected by only previously-recorded error-correcting codes. Therefore, the distance d should be set to a large value or errors should be corrected by the parity-check code sectors. However, a redundancy of code increases as the distance d increases. As a consequence, a processing time is extended and a recording capacity for recording data is lessened by an amount corresponding to the increase of redundancy. Furthermore, when the method for correcting errors by use of parity-check code sectors is used, if burst errors occur, data of all sectors recorded on the area have to be reproduced one more time and burst errors have to be corrected by use of the data reproduced one more time and the data used as parity-check codes recorded on the parity-check code sectors. Therefore, when burst errors occur, it takes a lot of time to correct the burst errors.

In accordance with the aforesaid aspect, it is an object of the present invention to provide a data recording/reproducing method, a data reproducing apparatus and a recording medium wherein processing can be carried out efficiently and data can satisfactorily be reproduced without decreasing a data storage capacity.

DISCLOSURE OF THE INVENTION

According to the present invention, when data is recorded, a first error-correcting code is generated with respect to a series of data of a predetermined amount, and the first error-correcting code is added to the data of the predetermined data amount from which the first error-correcting code is generated. A second error-correcting code is generated with respect to a series of data of a predetermined amount. The second error-correcting code is added to data other than the data of the predetermined amount from which the second error-correcting code is generated and recorded on a recording medium. Upon reproduction, data of a certain recording unit is reproduced from a recording medium in which data of respective recording units are recorded. It is detected on the basis of the first error-correcting code contained in the reproduced data of the recording unit whether or not errors can be detected and corrected. If errors can be detected and corrected, then the errors are detected and corrected. If the errors cannot be detected and corrected, then erasure information is generated on the basis of the second error-correcting code corresponding to the data of a certain recording unit reproduced from the recording unit in which the second error-correcting code concerning the data of a certain recording unit is contained. Then, the data of a certain recording unit is erased and corrected by use of the erasure information and the first error-correcting code. Thus, even when burst errors occur, the processing can be carried out efficiently and data can be reproduced satisfactorily without reducing a data recording capacity. In association therewith, there are disclosed a data recording/reproducing method, a data reproducing apparatus and a recording medium.

BRIEF DESCRIPTION OF DRAWINGS

FIG. 5 is an explanatory table showing sizes of regions of the optical disk shown in FIG. 4 and data clock frequencies used in the respective regions;

FIGS. 6A, 6B, 6C are explanatory diagrams showing sector formats of optical disk;

FIG. 7 is a table used to explain a manner in which parity-check codes used as 2nd ECC in the 8-line pattern of an optical disk (read-only disk or disk with readable regions) are added to data;

FIG. 9 is a diagram used to explain a specific region of a sector in the 8-line pattern of an optical disk (read-only disk and disk with readable regions);

FIG. 10 is a table used to explain a manner in which parity-check codes used as 2nd ECC in the 8-line pattern of the optical disk (recordable disk or disk with recordable regions) are added to data;

FIG. 14 is a table used to explain a manner in which parity-check codes used as 2nd ECC in the 7-line 8-line 7-line pattern of the optical disk (read-only disk or disk with readable regions) are added to data according to another embodiment of the present invention; and FIG. 15 is a table used to explain a manner in which parity-check codes used as 2nd ECC in the 7-line 8-line 7-line pattern of the optical disk (recordable disk or disk with recordable regions) are added to data.

BEST MODE CARRYING OUT THE INVENTION

Figure 1:
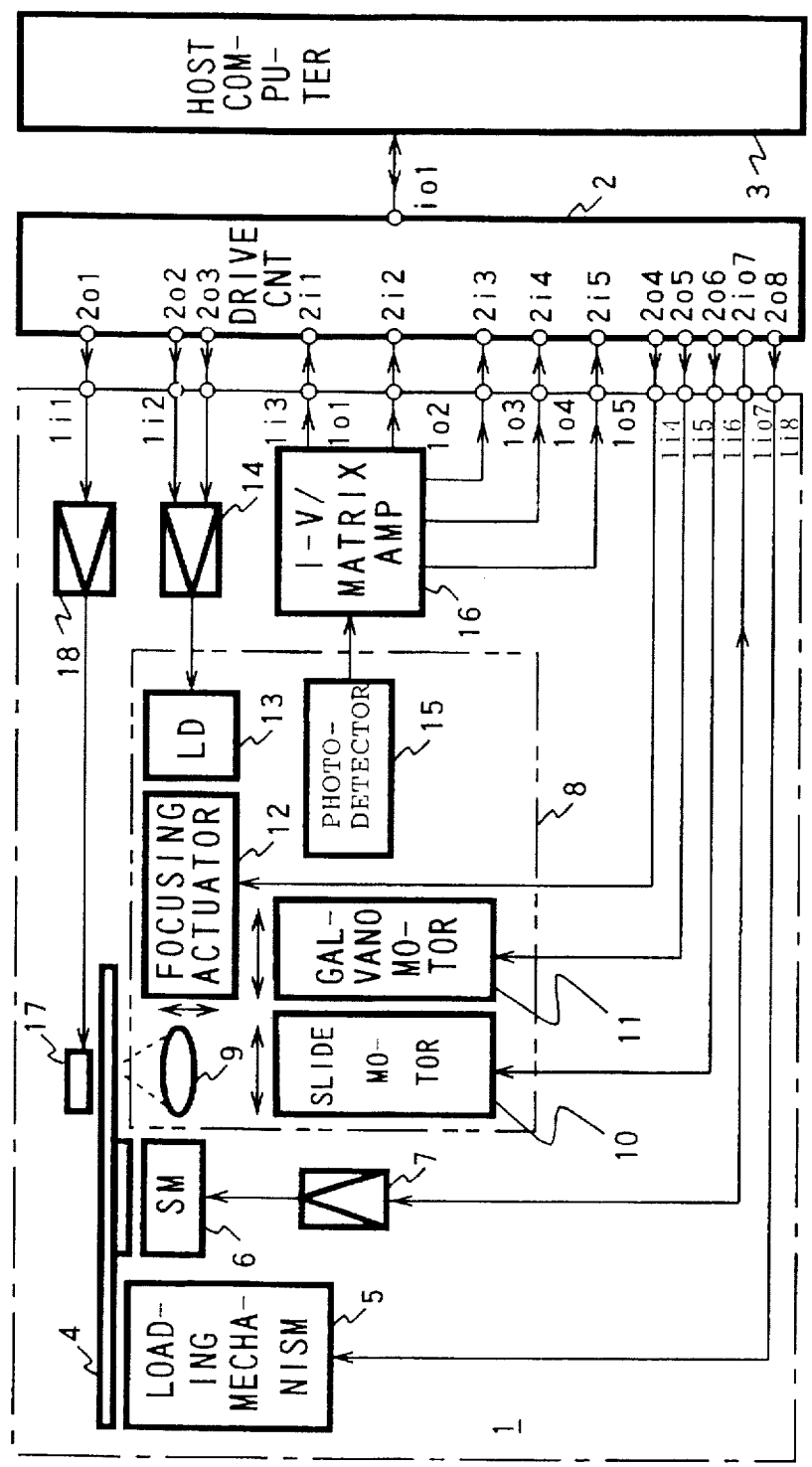
FIG. 1 is a block diagram showing an optical disk drive.

Initially, an outline of the present invention will be described.

A data recording method according to the present invention comprises a step (a) of generating a first error-correcting code with respect to a series of data of a predetermined amount, a step (b) of generating a second error-correcting code with respect to the series of data of a predetermined amount, a step (c) of generating data of respective units by adding the first error-correcting code of the predetermined amount from which the first error-correcting code is generated, and by adding the second error-correcting code to data of the predetermined amount other than the data of the predetermined amount from which the second error-correcting code is generated, and a step (d) of recording the data of the respective recording units on a recording medium. Therefore, upon reproduction, a series of data of the predetermined amount are corrected by use of the first error-correcting code. Also, a series of data of the predetermined amount can be corrected by the second error-correcting code added to the data other than a series of data of the predetermined amount. Thus, even when a burst error occurs, the processing can be carried out efficiently and data can be reproduced satisfactorily without reducing a data recording capacity.

In the step (d), data of second recording unit wherein the second error-correcting code concerning the data of the predetermined amount contained in the data of a first recording unit is contained is recorded on a recording position next to the recording position at which the data of the first recording unit is recorded. Therefore, the data of the first recording unit can be corrected by the second error-correcting code generated with respect to the data of the first recording unit recorded on the recording position next to a recording position of the data of the first recording unit. Thus, the data can be protected from the burst error highly reliably.

In the step (c), the data of the recording units are generated by adding identification data to the second error-correcting code concerning last data of the predetermined amount in a series of a plurality of data of the predetermined amount as data of the predetermined amount, thereby making it possible to recognize the last data of the predetermined amount in a series of a plurality of data of the predetermined amount.

Thus, a proper processing can be effected on the last data of the predetermined amount.

In the step (d), identification data are added to the leading data of the predetermined amount in a series of a plurality of data of the predetermined amount in place of the second error-correcting code, thereby making it possible to recognize the leading data of the predetermined amount in a series of a plurality of data of the predetermined amount. Therefore, a proper processing can be effected on the leading data of the predetermined amount in a series of a plurality of data of the predetermined amount.

The data recording method according to the present invention further includes a step of generating error-check codes. In the step (c), the data of the recording units are generated by adding the error-check code to relating data of the predetermined amount. Therefore, upon reproduction, errors can be checked and the error-detecting capability can be improved.

According to the present invention, upon recording, with respect to a first rewritable recording medium, a first error-correcting code is generated with respect to a series of data of a predetermined amount, a second error-correcting code is generated with respect to a series of data of the predetermined amount, and recording data of respective recording units are generated by adding the first error-correcting code to relating data of the predetermined amount and by adding the second error-correcting code to data of the predetermined amount other than the data of the predetermined amount relating to the second error-correcting code. The data of the respective recording units are recorded on a recording medium. With respect to a second recording medium that cannot be rewritten, the first error-correcting code is generated with respect to a series of data of predetermined amount, the second error-correcting code is generated with respect to a series of data of the predetermined amount, and the data of the respective recording units are generated by adding the first and second error-correcting codes to relating data of the predetermined amount. Then, the data of the respective recording units are recorded on the recording medium. Thus, upon reproduction, not only the first error-correcting code but also the second error-correcting code can be used. Also, it becomes possible to improve a processing speed when errors are corrected. Therefore, the error-correcting capability can be enhanced and the access speed can be increased.

In a step (a), data of a certain recording unit is reproduced from a recording medium with data of respective recording units recorded therein, the data of respective recording units are generated by adding the first error-correcting code generated with respect to a series of data of a predetermined amount to the data of the predetermined amount from which the first error-correcting code is generated and by adding the second error-correcting code generated with respect to a series of data of the predetermined amount to data other than the data of the predetermined amount from which the second error-correcting code is generated. In a step (b), it is determined on the basis of the first error-correcting code contained in the reproduced data of the certain recording unit whether or not errors can be detected and corrected. In a step (c), if errors can be detected and corrected, then the errors are detected and corrected. In a step (d), if the errors cannot be detected and corrected, then erasure information is generated on the basis of the second error-correcting code corresponding to the data of the certain recording unit reproduced from the recording unit wherein the second error-correcting code concerning the data of the certain recording unit is included. In a step (e), the data of the certain recording unit is erased and corrected by use of the erasure information and the first error-correcting code. Therefore, even when errors exceeding the error-correcting capability of the first error-correcting code occur, the erasure information is obtained by use of the second error-correcting code and the errors can be erased and corrected by the erasure information and the first error-correcting code. Thus, without increasing the distance, the error-correcting capability can be enhanced and the processing speed of the error correction can be improved.

Further, an error-detecting code concerning data contained in the recording unit is added to the data of the respective recording units. In a step (f), the data detected and corrected at the step (c) is error-checked on the basis of the error-detecting code of the recording unit. Thus, the data can be error-checked upon reproduction. Therefore, the error-detecting capability can be improved.

If errors are detected at the step (f), then the processing proceeds to step (d), whereby the processing based on the step (d) can be executed. Therefore, the processing for erasure and correction is carried out. As a result, the errors can be erased and corrected at the step (e) and the error-correcting capability can be improved much more.

As previously stated, an error-detecting code for the data contained in the recording unit is added to the data of the recording unit. In a step (g), the data that has been erased and corrected at the step (e) is error-checked on the basis of the error-detecting code of the recording unit, thereby making it possible to error-check the erased and corrected data. Therefore, the error-detecting capability can be improved much more.

In the step (d), the data of a recording unit is reproduced from the recording unit which contains the second error-correcting code corresponding to the data of the certain recording unit. The reproduced data of the recording unit is error-checked by the error-detecting code contained in the reproduced data of the recording unit. If errors are not detected by the error-detecting code, then erasure information for the data of the certain recording unit is generated by the second error-correcting code corresponding to the data of the certain recording unit. Thus, when errors are not detected, data can be erased and corrected by the second error-correcting code. Therefore, with the short distance, a higher error-correcting capability can be realized.

Further, the present invention comprises reproducing means for reproducing data at the recording unit from a recording medium with data of respective recording units being recorded therein, the data of respective recording units being generated by adding first error-correcting code generated with respect to a series of data of a predetermined amount to the data of the predetermined amount from which the first error-correcting code are generated and by adding second error-correcting code generated with respect to a series of data of the predetermined amount to the data of the predetermined amount other than the data of the predetermined amount from which the second error-correcting code is generated, and error-correcting means for detecting on the basis of the first error-correcting code contained in the reproduced data of a certain recording unit whether or not errors can be detected and corrected, detecting and correcting the errors if the errors can be detected and corrected, generating erasure information on the basis of the second error-correcting code corresponding to the data of the certain recording unit reproduced from the recording unit which contains the second error-correcting code corresponding to the data of the certain recording unit if the errors cannot be detected and corrected, and erasing and correcting the data of the certain recording unit by the erasure information and the first error-correcting code. With the above arrangement, upon reproduction, if errors cannot be detected and corrected, the errors can be erased and corrected by use of the second error-correcting code. Therefore, without lowering the access speed, the error-correcting capability can be improved.

Error-detecting codes for data contained in the recording unit are further added to the data of the recording unit. The error-correcting means error-checks the detected and corrected data on the basis of the error-detecting codes of the recording unit, thereby making it possible to error-check the detected and corrected data. Therefore, the error-detection capability can be improved much more.

When errors are detected by the error-checking, the error-correcting means generates erasure information on the basis of the second error-correcting code corresponding to the data of a certain recording unit reproduced from the recording unit which contains the second error-correcting code corresponding to the data of a certain recording unit and erases and corrects the data of a certain recording unit by use of the erasure information and the first error-correcting code. Thus, even when errors exceeding the error-correcting capability of the first error-correcting code occur, the errors can be erased and corrected by use of the erasure information obtained from the second error-correcting code. Therefore, without extending the distance, the error-correction capability can be improved.

The error-detecting codes for the data contained in the recording unit are added to the data of the recording unit. The error-correcting means error-checks the erased and corrected data on the basis of the error-detecting codes of the recording unit, thereby making it possible to error-check the erased and corrected data. Thus, the error-correction capability can be improved.

If errors cannot be detected and corrected, the error-correcting means error-checks the data of the recording unit reproduced from the recording unit which contains the second error-correcting code corresponding to the data of a certain recording unit by the error-detecting codes contained in the reproduced data of the recording unit. If errors cannot be detected by the error-detecting codes, then the error-correcting means generates erasure information for the data of a certain recording unit on the basis of the second error-correcting code corresponding to the data of a certain recording unit, thereby making it possible to erase and correct errors by use of the erasure information and the first error-correcting code. Therefore, without increasing the distance, the error-correcting capability can be improved much more.

A read-only recording medium is used. Since the read-only recording medium does not need to replace a defective sector, it is possible to improve a processing time required when errors are corrected by adding the second error-correcting code to another recording unit.

Further, the present invention comprises identifying means for identifying a first recording medium with data of respective recording units recorded therein, the data of respective recording units being generated by adding a first error-correcting code generated with respect to a series of data of a predetermined amount to data of the predetermined amount from which the first error-correcting code is generated and by adding a second error-correcting code generated with respect to the series of data of the predetermined amount to data of the predetermined amount other than data of the predetermined amount from which the second error-correcting code is generated and a second recording medium with data of respective recording units recorded therein, the data of respective recording units being generated by adding a first error-correcting code generated with respect to a series of data of a predetermined amount and a second error-correcting code generated with respect to a series of data of the predetermined amount to the data of the predetermined amount from which the first and second error-correcting codes are generated, reproducing means for reproducing data from the first and second recording mediums at the recording unit, and error-correcting means for detecting on the basis of the first error-correcting code contained in the reproduced data of a certain recording unit whether or not errors can be detected and corrected, detecting and correcting the errors if the errors can be detected and corrected, generating erasure information on the basis of the second error-correcting code corresponding to the data of the certain recording unit reproduced from the recording unit which contains the second error-correcting code corresponding to the data of the certain recording unit, and erasing and correcting the data of the certain recording unit by use of the erasure information and the first error-correcting code if the errors cannot be detected and corrected when the identifying means identifies a recording medium as said first recording medium, and for detecting on the basis of the first error-correcting code contained in the reproduced data of the certain recording unit whether or not errors can be detected and corrected, detecting and correcting the errors if the errors can be detected and corrected, generating erasure information on the basis of the second error-correcting code contained in the data of the certain recording unit if the errors cannot be detected and corrected, and erasing and correcting the data of the certain recording unit by use of the erasure information and the first error-correcting code if the identifying means identifies a recording medium as the second recording medium. According to the above arrangement, if the errors cannot be detected and corrected by the first error-correcting code, the erasure information is obtained by the second error-correcting code and the data can be erased and corrected by use of the erasure information and the first error-correcting code. Therefore, without lowering the access speed and without extending the distance, the error-correcting capability can be improved.

According to the present invention, there is provided a recording medium with data of respective recording units recorded therein. The data of respective recording units are generated by adding a first error-correcting code generated with respect to a series of data of a predetermined amount to the data of the predetermined amount from which the first error-correcting code is generated and by adding a second error-correcting code generated with respect to a series of data of a predetermined amount to data of the predetermined amount other than the data of the predetermined amount from which the second error-correcting code is generated. If this recording medium is used, when errors cannot be detected and corrected by the first error-correcting code, the errors can be corrected by use of the second error-correcting code.

Further, the data of the recording unit which contains the second error-correcting code in relation to the first error-correcting code is recorded at a recording position next to a recording position at which the data of the recording unit which contains the first error-correcting code concerning the data of the predetermined amount is recorded. Thus, in order to error-correct some data, the second error-correcting code can be read out from the recording position next to the recording position of the data. Therefore, a time consumed by the error-correction can be reduced and the access speed can be increased.

With respect to the second error-correcting code concerning the last data of the predetermined amount in a series of data of the predetermined amount, the data of the recording unit with the identification data added as the data of the predetermined amount is recorded, thereby making it possible to confirm that data is the last data of the predetermined amount. Therefore, the last data of the predetermined amount can be processed properly.

With respect to the leading data of the predetermined amount in a series of data of the predetermined amount, the identification data is added in place of the second error-correcting code, thereby making it possible to confirm that data is the leading data of the predetermined amount. Therefore, the leading data of the predetermined amount can be processed properly.

Further, the data of the respective recording units contain error-check codes concerning the data of the predetermined amount contained in the recording units, whereby errors can be checked by the error-check codes. Therefore, the error-detecting capability can be improved.

Furthermore, the read-only recording medium is used. Since the read-only recording medium does not need replacing the defective sector, if the second error-correcting code is added to other recording units, then it is possible to reduce the processing time consumed when errors are corrected.

The present invention will hereinafter be described in detail with reference to the accompanying drawings.

FIG. 1 of the accompanying drawings shows in block form an example of an optical disk drive. This optical disk drive can record and reproduce data on and from a magneto-optical disk and a write once disk, read data from a read-only optical disk, write and read data in and from a writable and readable region of a so-called partial ROM (read-only memory) composed of a writable and readable region and a read-only region and read data from a read-only region.

An optical disk drive, generally denoted at reference numeral 1 in FIG. 1, records data on an optical disk 4 and reproduces data from the optical disk 4. The optical disk drive 1 is operated under control of a drive controller 2. The optical disk drive 1 is connected to a host computer 3 through an input and output terminal io1 of a SCSI (small computer systems interface) of the drive controller 2. The optical disk drive 1 is accessed by the host computer 3 through the drive controller 2.

As the optical disk 4, there can be used a magneto-optical disk, a phase change type optical disk, a write once disk, a partial disk composed of a writable region (RAM) and a read-only region (ROM), a read-only optical disk or the like.

The optical disk drive 1 comprises a loading mechanism 5 for loading the optical disk 4, a spindle motor (SM) 6 for rotating the optical disk 4 loaded by the loading mechanism 5, a driver 7 for driving the spindle motor 6, an optical block 8, a driver 14 for driving a laser diode (LD) of the optical block 8, an I-V/matrix amplifier 16 for converting a reproduced signal from the optical block 8 in the form of I-V (current-to-voltage) and supplying a thus converted voltage signal to a plurality of systems, a magnetic head 17 for applying a magnetic field to the optical disk 4 and a driver 18 for driving the magnetic head 17. The I-V/matrix amplifier 16 obtains an RF signal and a MO (magneto-optical) signal by combination of a number of outputs from a photodetector 15, which will be described later on, of the optical block 8.

The optical block 8 comprises a lens system 9 for irradiating laser beam emitted from the laser diode 13 on the optical disk 4 and which introduces reflected laser beam from the optical disk 4 into a photodetector 15, a slide motor 10 for moving the optical block 10 in the radius direction of the optical disk 4, a galvano motor 11, a focusing actuator 12 and the laser diode 13.

A driver 18 for driving the magnetic head 17 is connected through an input terminal 1i1 to an output terminal 2o1 of the drive controller 2. A driver 14 for driving the laser diode 13 is connected through input terminals 1i2, 1i3 to output terminals 2o2, 2o3 of the drive controller 2. The I-V/matrix amplifier 16 is connected through output terminals 1o1, 1o2, 1o3, 1o4, 1o5 to input terminals 2i1, 2i2, 2i3, 2i4, 2i5 of the drive controller 2. The focusing actuator 12 is connected through an input terminal 1i4 to an output terminal 2o4 of the drive controller 2. The galvano motor 11 is connected through an input terminal 1i5 to an output terminal 2o5 of the drive controller 2. The slide motor 10 is connected through an input terminal 1i6 to an output terminal 2o6 of the drive controller 2. The driver 7 of the spindle motor 6 is connected through an input terminal 1i7 to an output terminal 2o7 of the drive controller 2. The loading mechanism 5 is connected through an input terminal 1i8 to an output terminal 2o8 of the drive controller 2.

The drive controller 2 carries out a processing for transmitting and receiving command signals and data. Upon recording, the drive controller 2 adds CRC (cyclic redundancy check) code and an error-correction code to data supplied thereto from the host computer 3 and transfers the resultant data to the optical disk drive 1. Upon reproduction, the drive controller 2 error-corrects data supplied thereto from the optical disk drive 1 and transfers only the user data portion to the host computer 3. When the data is recorded and reproduced, the drive controller 2 supplies command signals to the servo system and each block of the optical disk drive 1.

Figure 2:
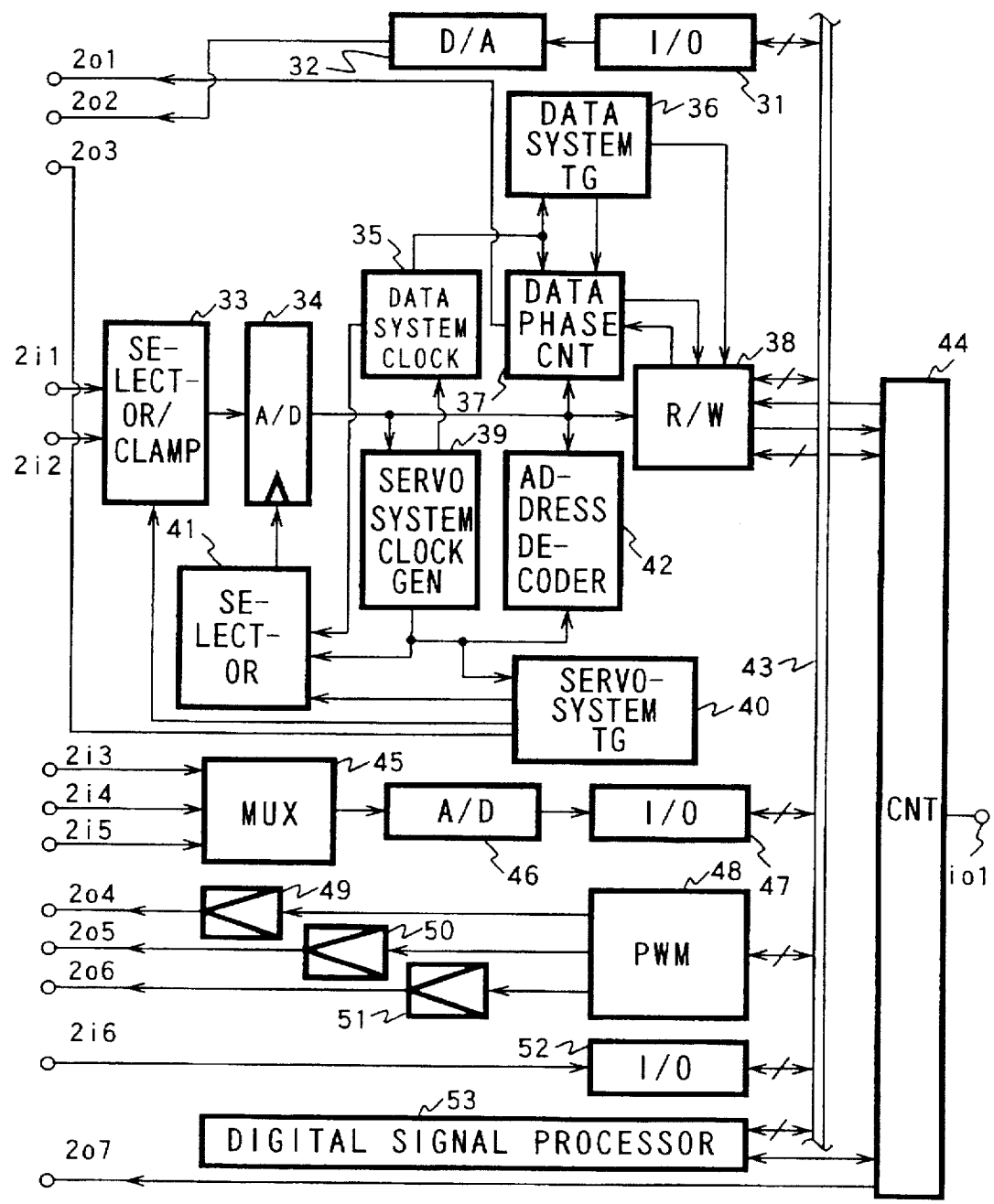
FIG. 2 is a block diagram showing a drive controller shown in FIG. 1.

FIG. 2 is a block diagram showing the arrangement of the drive controller 2 shown in FIG. 1.

As shown in FIG. 2, an input/output (I/O) circuit 31 supplies bias data of the laser diode 13 supplied thereto from a digital signal processor 52 through a bus 43 to the driver 18 shown in FIG. 1 through a digital-to-analog (D/A) converter 32 and an output terminal 2o2. A selector/clamp circuit 33 selects outputs supplied thereto from the I-V/matrix amplifier 16 shown in FIG. 1 through input terminals 2i1, 2i2 on the basis of a timing signal supplied thereto from a servo-system timing generator 40 which will be described later on, and clamps a selected output. An analog-to-digital (A/D) converter 34 converts an output supplied thereto from the selector/clamp circuit 33 into digital data on the basis of a servo-system clock signal or data-system clock signal selected by a selector 41.

A data-system clock generator 34 generates the data-system clock signal on the basis of a servo-system clock signal supplied thereto from a servo-system clock generator 39. A data-system timing generator 36 generates a data-system timing signal on the basis of the data-system clock signal. A data phase controller 37 controls the phase of the data-system clock signal supplied thereto from the data-system clock generator 35 on the basis of reference phase data extracted from reproduced data supplied from the A/D converter 34 and supplies the data-system clock signal to a read/write circuit 38 as a read clock. Also, the data phase controller 37 controls a phase of a write position control signal supplied thereto from the read/write circuit 38 and outputs the same through an output terminal 2o1.

Upon reproduction, the read/write circuit 38 is responsive to a request signal supplied thereto from a controller 44 to supply the output of the A/D converter 34 to the controller 44 to output an acknowledge signal on the basis of the data-system clock signal supplied thereto from the data-system clock generator 35 and the data-system timing signal supplied thereto from the data-system timing generator 36. Upon recording, the read/write circuit 38 supplies data supplied thereto from the controller 44 through the output terminal 2o1 and the input terminal 1i1 shown in FIG. 1 to the driver 18.

The servo-system clock generator 39 generates the servo-system clock signal from the output of the A/D converter 34 and supplies the servo-system clock signal to a servo-system timing generator 40, a selector 41 and an address decoder 42. The servo-system timing generator 40 generates a servo-system timing signal on the basis of the servo-system clock signal supplied thereto from the servo-system clock generator 39 and supplies the servo-system timing signal to the selector 41, the address decoder 42 and the selector/clamp circuit 33. Also, the servo-system clock generator 39 supplies the servo-system timing signal through the output terminal 2o3 and the input terminal 1i3 shown in FIG. 1 to the driver 14 of the laser diode 13.

A multiplexer 45 supplies a front APC (automatic power control) signal, a focusing error signal and a pull-in signal supplied thereto through the input terminals 2i3, 2i4, 2i5 from the I-V/matrix amplifier 16 shown in FIG. 1 to an A/D converter 46. An I/O circuit 47 supplies an output signal of an A/D converter 46 through a bus 43 to a digital signal processor 53. A pulse-width modulation (PWM) circuit 48 modulates drive data for driving the optical block 8 supplied thereto through the bus 43 from the digital signal processor 53.

A driver 49 is connected through an output terminal 2o4 and the input terminal 1i4 shown in FIG. 1 to the focus actuator 12. The driver 49 drives the focus actuator 12 shown in FIG. 1. A driver 50 is connected through an output terminal 2o5 and the input terminal 1i5 shown in FIG. 1 to the galvano motor 11. The driver 50 drives the galvano motor 10 shown in FIG. 1. A driver 51 is connected through an output terminal 2o6 and the input terminal 1i6 shown in FIG. 1 to the slide motor 11 shown in FIG. 1.

An input/output circuit 52 supplies the drive signal supplied thereto from the digital signal processor 53 through an output terminal 2i6 and the driver 7 shown in FIG. 1 to the spindle motor 6. The digital signal processor 53 is connected to the controller 44 through the bus 43 shown by a bold solid line in FIG. 2. The digital signal processor 53 controls and drives each block through the bus 43.

The digital signal processor 53 supplies a command signal through the input/output circuit 52 to the driver 7 so that the driver 7 drives the spindle motor 6 in response to a request signal supplied thereto from the host computer 3 under the condition that the optical disk 4 is loaded on the spindle motor 6 by the loading mechanism 5 or if the optical disk 4 is loaded by the loading mechanism 5 when an automatic spin-up mode is set.

The driver 7 outputs a clock signal to inform the stable rotation of the spindle motor 6 to the digital signal processor 53 when the spindle motor 6 reaches a predetermined rotational speed. During this period of time, the digital signal processor 53 controls the driver 51 through the PWM circuit 48 so as to move the laser beam emitted from the laser diode 13 outside of the user area of the optical disk. Also, the digital signal processor 53 controls the driver 51 so as to move the optical block 8 to the outer or inner peripheral side of the optical disk 4.

If the focusing is pulled in the user area, there is then the possibility that data of the disk with high sensitivity will be erased unintentionally. In such case, if the optical block 8 is moved outside of the user area and the focusing is pulled in outside the user area, then such mis-erasure can be prevented.

When the rotational speed of the spindle motor 6 reaches a predetermined one and the optical block 8 is moved to the outer peripheral side of the optical disk 4, for example, the digital signal processor 53 sets a bias current of the laser diode 13 disposed on the optical block 8 to the driver 14 through the input/output circuit 31 and the D/A converter 32 and outputs a command signal to the timing generator 40 which energizes and deenergizes the laser diode 13 such that the laser diode 13 emits laser beams.

The laser beam emitted from the laser diode 13 is introduced into the photodetector 15 disposed on the optical block 8. The photodetector 15 converts the laser beam introduced therein into an electrical signal and supplies the resultant electrical signal to the I-V/matrix amplifier 16, wherein it is converted into a voltage and supplied to the multiplexer 45 as the front APC signal.

The front APC signal is processed by the multiplexer 45 as a time-division multiplexed signal and then converted into a digitized front APC signal by the A/D converter 46, whereafter it is supplied through the input/output circuit 47 and the bus 43 to the digital signal processor 53. The digital signal processor 53 recognizes a power (intensity) of laser beam emitted from the laser diode 13 on the basis of the digitized front APC signal and feds power control data calculated by a digital filter (not shown) through the input/output circuit 31 and the D/A converter 32 back to the driver 14, thereby making the power (intensity) of the laser diode 13 become constant.

Then, the digital signal processor 13 supplies a current from the PWM circuit 48 to the driver 49 to move the focusing actuator 12 of the optical block 8 in the upper and lower direction to thereby place the focusing actuator 12 in the focus search mode. At that very moment, laser beam reflected on the optical disk 4 is introduced into the light-receiving surface of the photodetector 15. The laser beam received at the photodetector 15 is converted into an electrical signal and supplied to the I-V/matrix amplifier 16 as a detection output. The electrical signal supplied to the I-V/ matrix amplifier 16 is converted into a voltage and amplified, whereafter it is output as a focus error signal and supplied to the multiplexer 45.

Similarly to the front APC signal, the focus error signal is processed by the multiplexer 45 as a time-division multiplexed signal and converted into a digitized focus error signal by the A/D converter 45. Then, the digitized focus error signal is supplied through the input/output circuit 47 and the bus 43 to the digital signal processor 53. The digital signal processor 53 filters out the digitized focus error signal by a digital filter (not shown) to provide focus control data and feds the focus control data from the PWM circuit 48 to the driver 49, thereby constructing a focus control servo loop. When focus control is stabilized, the RF signal obtained from the I-V/matrix amplifier 16 through the photodetector 15 has a certain constant amplitude and clamped to a predetermined potential by the selector/clamp circuit 33, whereafter it is digitized by the A/D converter 34.

A clock provided at that time becomes a free-running frequency of the servo-system clock generator 39. A signal which results from dividing the free-running frequency by a predetermined value is used as a timing pulse for clamping the RF signal.

The servo-system clock generator 39 checks patterns of pits formed on the optical disk 4 on the basis of an amplitude difference of the RF signals digitized by the A/D converter 34 and searches the same patterns as those of the pits in the service area. Having detected the pattern, the servo-system clock generator 39 controls the clock selector 41 so as to open a window at the position where the next pattern appears. Then, the servo-system clock generator 39 determines again whether patterns are agreed with each other.

If this operation can be confirmed continuously a certain number of times, then the servo-system clock generator 39 determines that it is locked to the pit pattern of the optical disk 4. Phase information can be obtained by calculating an amplitude difference between two leading edges of the wobble pits provided within the servo area. A gain fluctuation occurred when the amplitude is changed depending on the tracking position can be absorbed by adding phase information obtained from the two wobble pits.

When the servo-system clock generator 39 is locked, the position of the segment unit becomes clear so that the position of the segment mark pit formed on the optical disk 4 becomes recognizable. Then, a position at which the RF signals sampled at a plurality of predetermined positions Ar1, Ar2, Ar3 and Ar4 for the segment mark pit, the address mark pit, the sector flag 1 pit and the sector flag 2 pit become maximum in amplitude is searched.

If the searched result is the Ar1, then the mark is the address mark and the segment is the address segment so that the starting portion of the frame can be recognized. Therefore, the frame synchronization can be achieved by resetting the frame counter. When one frame is composed of 14 segments, the clock selector 41 is controlled so as to open the window at every 14 segments. Thus, the checked result can be continuously recognized as the address mark. Also, it is judged that the frame synchronization is locked.

When the frame synchronization is established, the position at which the address is recorded on the optical disk 4 can be recognized. Hence, the address decoder 42 decodes the track address and the frame code. The address decoder 42 decodes the track address and the frame code by checking a coincidence between a pattern converted into a gray code at every four bits and a gray code table. However, since the pattern is not converted into the gray code only by four bits but the whole pattern is converted into the gray code, the gray code pattern is not simply compared with the gray code table but compared with a table that is inverted depending on whether the LSB within the four bits is held at "1" or "0".

If it is confirmed that a numerical value which results from loading the first decoded frame code in the frame counter and incrementing the frame counter at every frame and an actually reproduced frame code are agreed with each other, then the rotational synchronization is achieved. If the numerical values obtained from the frame counter are fed back to the digital signal processor 53, then it is possible to prevent the frame position from being erroneously recognized even though the optical disk 4 has a few defects.

The digital signal processor 53 calculates the speed of the optical block 8 by reading the track address previously-converted into the gray code. Then, the digital signal processor 53 moves the optical block 8 to a target track on the optical disk 4 by controlling the slide motor 10 of the optical block 8 from the PWM circuit 48 through the driver 51.

When the position of the optical block 8 coincides with the position of the target track, the digital signal processor 53 enters the tracking operation. The tracking error signal is obtained by calculating a difference between the amplitude values of the RF signal relative to the two wobble pits in the servo area as described above. The digital signal processor 53 controls a fluctuation of a low frequency component by controlling the galvano motor 11 of the optical block 8 with the tracking control data, which results from digitally filtering the tracking error signal, supplied to the galvano motor 11 through the driver from the PWM circuit 48. Further, the digital signal processor 53 effects the tracking control such that the spot of the laser beam emitted from the laser diode 13 is placed at the center of the track of the optical disk 4.

The digital signal processor 53 detects the starting position of the target track under the tracking control. As described above, the first segment and the preceding segment of each sector have the sector marks. Each sector mark controls the selector 41 in such a way as to open the windows at the four positions Ar1, Ar2, Ar3 and Ar4. When the position at which the RF signals sampled at the four positions Ar1, Ar2, Ar3 and Ar4 become the maximum amplitude is the position Ar3, the sector mark indicates the starting segment of the sector. When it is the position Ar3, the sector mark indicates the preceding segment of the sector. Fundamentally, the starting segment of the sector is determined by calculating the order of the segment of the track indicated by the physical sector obtained after the sector address from the host computer 3 has been converted into the physical sector. However, since there is then very small probability that the two kinds of the sector marks become defective simultaneously, there is very small probability that the defective sector will be produced.

The data-system clock generator 35 generates a data clock which results from multiplying the frame synchronization servo clock from the servo-system clock generator 39 by M/N and supplies this data clock to the data-system timing generator 36 and the read/write circuit 38.

In the recording operation mode, recording data from the host computer 3 is supplied through the controller 44 to the read/write circuit 38. The read/write circuit 38 scrambles data in accordance with $Y=X^7+X+1$ by adding (exclusive-OR) a random number of 127 cycles, for example, to the recording data. Then, the read/write circuit 38 modulates the recording data thus scrambled into NRZI (non-return-to-zero inverted) series data synchronized with the data clock. At that time, the initial value is reset to "0" at every segment and a modulated signal is supplied through the driver 18 to the magnetic head The magnetic head 17 generates a magnetic field corresponding to the modulated signal. The magnetic head 17 records the NRZI series data on the optical disk 4 by application of the magnetic field thus generated to the optical disk 4 at its data area heated up to a Curie temperature with laser beams emitted from the laser diode 13.

In the reproducing operation mode, the MO (magneto-optical) signal or RF (radio frequency) signal obtained by the I-V/matrix amplifier 16 from the detected output generated from the photodetector 15 is clamped to a predetermined potential by the selector/clamp circuit 33 and converted into a digital signal by the A/D converter 34, whereafter it is supplied to the read/write circuit 38. The read/write circuit 38 processes the reproduced signal digitized by the A/D converter 34 in a digital filter processing fashion matched with a partial response and reproduces the NRZI series data by Viterbi decoding. After the NRZI series data was converted into NRZI series data at the segment unit, the converted NRZI series data is descrambled at the sector unit as reproduced data. The reproduced data is transferred through the controller 44 to the host computer 3. The MO signal and the RF signal are obtained by calculating different combinations of a number of outputs from the photodetector 15.

Figure 3:
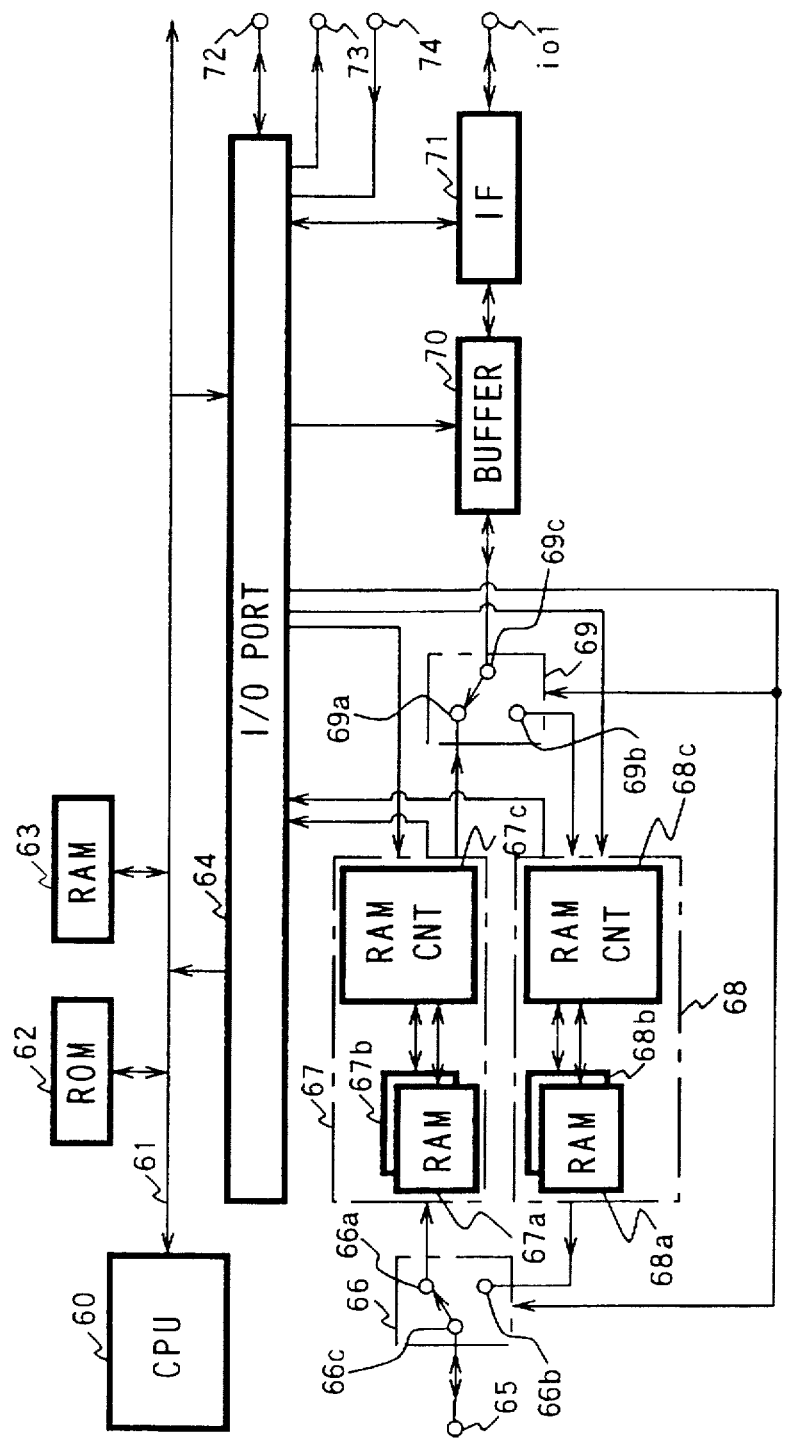
FIG. 3 is a block diagram showing a controller of the optical disk drive shown in FIG. 1.

FIG. 3 is a block diagram showing the controller 44 shown in FIG. 2.

In the controller 44 shown in FIG. 3, a bus 61 composed of an address bus, a data bus and a control bus is connected to a CPU (central processing unit) 60. A ROM 62 with various program data and parameter data for effecting processing in the reproducing operation mode stored therein, a RAM 63 used as a work area such as the program data stored in the ROM 62, an input/output port 64, a decoder 67 for error-correcting and error-checking reproduced data, an encoder 68 for generating a parity-check code for data supplied thereto from the host computer 3, a buffer 70 and an interface circuit 71 are all connected to the bus 61.

An input terminal 65 is connected to the read/write circuit 38 shown in FIG. 2 and a movable contact 66c of a switch 66. One fixed contact 66a of the switch 66 is connected to an input terminal of the decoder 67. The other fixed contact 66b of the switch 66 is connected to an output terminal of the encoder 68.

A data output terminal of the decoder 67 is connected to one fixed contact 69a of the switch 69. An input terminal of the encoder 68 is connected to the other fixed contact 69b of the switch 69. A movable contact 69c of the switch 69 is connected to an input and output terminal of the buffer 70. The input and output terminal of the buffer 70 is connected to an input and output terminal of the interface (I/F) circuit 71. The input and output terminal of the interface circuit 71 is connected through the input and output terminal io1 to the input and output terminal of the host computer 3 shown in FIG. 1.

The decoder 67 error-detects reproduced data supplied thereto from the switch 66 by use of a first ECC. When the number of detected errors reaches the number of errors that cannot be corrected and the decoder 67 error-checks the reproduced data by use of the CRC code and detects an error, the decoder 67 error-detects the reproduced data by use of a second ECC.

The decoder 67 comprises RAMs 67a, 67b and a RAM controller 67c for error-correcting data by LDC and error-checking data by the CRC code by controlling the reproduced data written in the RAMs 67a, 67b. The RAM controller 67 further error-detects data by a 2nd ECC when a burst error where data cannot be error-corrected and error-checked occurs. The error-detection using the 2nd ECC will hereinafter be referred to as "error check". The RAMs 67a, 67b have a total storage capacity of capacities of one sector (2352 bytes) for storing reproduced data therein and capacities for storing various data generated in an error detection and an error correction which will be described later on.

An output of the decoder 67 is supplied through the switch 69 to the buffer 70. The 2nd ECC is a parity-check code recorded on a predetermined area of the next sector of the corresponding sector of parity-check codes of the ECC generated by the data of the recording sector. The 2nd ECC is a parity-check code used to detect an error position of data of the corresponding sector when data of the certain sector cannot be error-corrected by the parity-check code serving as the 1st ECC upon decoding or the occurrence of error is detected by the error-checking with the CRC code.

As shown in FIG. 3, the encoder 68 comprises RAMs 68a, 68b each having a storage capacity of one sector, and a RAM controller 68c for generating a parity-check code used as a 1st ECC, a parity-check code used as a CRC code, a parity-check code used as a 2nd ECC and adding these parity-check codes by controlling input data written in the RAMs 68a, 68b. The encoder 68 adds only the parity-check code generated as the 2nd parity-check code for the user data of the certain sector to the user data of the next sector.

The encoder 68 adds the above-mentioned parity-check codes to data transferred thereto from the host computer 3 and also adds the parity-check code of the 2nd ECC of the immediately-preceding sector to the data.

The optical disk drive 1 shown in FIG. 1 can record error-checking parity-check codes and error-correcting parity-check codes in writable regions of the magneto-optical disk, the write-once disk, and the partial disk. Therefore, if the above-mentioned parity-check codes are recorded on the read-only optical disk and the read-only region of the partial disk, then they are recorded thereon when the disks are manufactured.

An input and output terminal 72 connected to the input and output (I/O) port 64 is connected to the bus 43 of the digital signal processor 53 shown in FIG. 2. An output terminal 73 is connected to an acknowledge signal input terminal of the read/write circuit 38 shown in FIG. 2. An input terminal 74 is connected to a request signal output terminal of the write/read circuit 38 shown in FIG. 2.

Initially, a manner in which data transferred from the host computer 3 is recorded on the optical disk 4 will be described.

The CPU 60 supplies a switching control signal through the input and output port 64 to the switches 66 and 69, whereby the switches 66 and 69 connect the movable contacts 66a, 69a to the fixed contacts 66b, 69b. Thus, recording data transferred from the host computer 3 is read out from the buffer 70 and then supplied through the switch 69 to the encoder 68, wherein it is added with the error-detecting code and the error-correcting code and supplied through the switch 66 and the output terminal 65 to the read/write circuit 38 shown in FIG. 2, thereby being recorded on the user area of the optical disk 4.

At that time, the encoder 68 adds a parity-check code to data of the certain sector (N sector) stored on the RAM 68a. When the processing for recording is ended, the encoder 68 supplies data of N sector through the switch 66 to the input and output terminal 65 and also supplies a signal indicative of the end of the processing for the recording through the input and output port 64 and the bus 61 to the CPU 60. Therefore, the CPU 60 issues a recording command signal to the read/write circuit 38 shown in FIG. 2 and controls the buffer 70 and the interface circuit 71 in order to receive the next input data, whereby all data on the N sector are supplied to the optical disk drive 1 and recorded on the optical disk 4. During this period of time, the next input data is written in the RAM 68b as data of the next sector (N+1 sector).

An operation in the reproducing mode will be described. The CPU 60 supplies a switching control signal through the input and output port 64 to the switches 66 and 69, whereby the switches 66 and 69 connect the movables contacts 66c, 69c to the fixed contacts 66a, 69a, respectively. Thus, reproduced data read out from the optical disk 4 and supplied through the read/write circuit 38, the input and output terminal 65 and the switch 66 is supplied to the decoder 67, wherein it is error-detected and error-corrected and then supplied through the switch 69, the buffer 70, the interface circuit 71 and the input and output terminal io1 to the host computer 3 shown in FIG. 1.

At that very moment, the decoder 67 error-corrects the data of N sector stored in the RAM 67a by the parity-check code used as the 1st ECC and error-checks the above data of N sector by use of the parity-check code used as the CRC code. Further, when the burst error occurs so that errors cannot be corrected, the decoder 67 reads out the parity-check code used as the 2nd ECC from the data of the N+1 sector stored in the RAM 67b and detects the error position by the parity-check code used as the 2nd ECC. Having confirmed the error position, the decoder 67 error-corrects data one more time by use of the parity-check code used as the 1st parity-check code to thereby correct the data of the N sector and then error-checks data by use of the CRC parity-check code.

At the completion of the above-mentioned reproducing processing, the decoder 67 outputs the data of the N sector and supplies a signal indicative of the end of the reproducing processing through the input and output port 64 and the bus 61 to the CPU 60, whereby the CPU 60 issues a command signal to the read/write circuit 38 shown in FIG. 2 such that the read/write circuit 38 reproduces data of the next sector. Therefore, all data of the N sector are supplied to the buffer 70. Subsequently, reproduced data of the N+2 sector read out from the optical disk 4 is supplied to the RAM 67a.

The optical disk drive 1 shown in FIGS. 1 to 3 can use the read-only optical disk, the disk such as the partial disk having the writable region, the disk having the writable region in addition to the read-only region, and the disk such as the magneto-optical disk and the write-once disk having only the read-only region and the disk having the readable region in addition to the write-only region.

Figure 4:
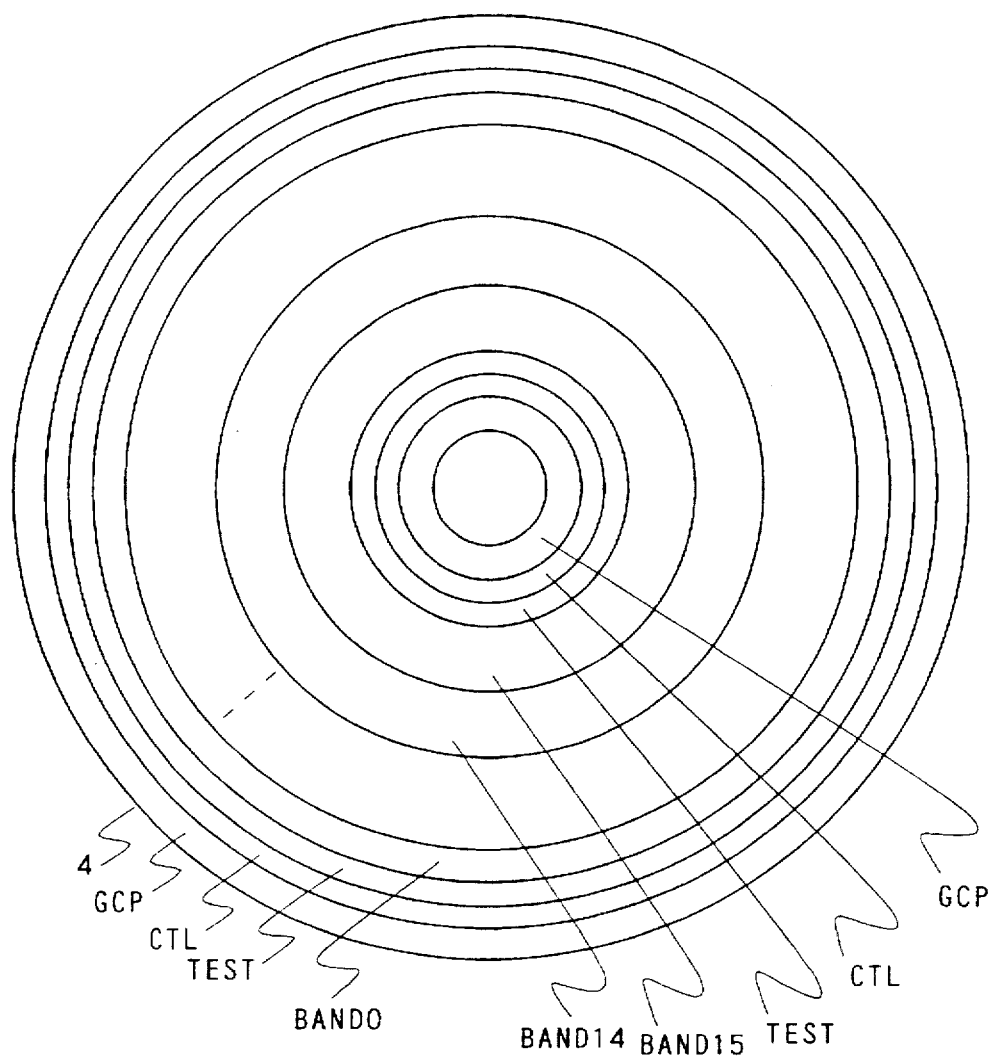
FIG. 4 is an explanatory diagram showing an optical disk format.

FIG. 4 is a diagram used to explain a format of an optical disk to which the recording medium of the present invention is applied.

As shown in FIG. 4, the optical disk 4 has a format composed of a GCP (gray code part) region with disk type data recorded therein, a CTL (control) region, a TEST (test) region, data region ranging from BAND (band) 0 to BAND 15, a TEST region, a CTL (control) region, and a GCP region set from the outermost periphery to the innermost periphery thereof, in that order. The GCP region records added information and address information thereon and also has the bit pattern formed thereon in the form of the gray codes. Therefore, information on the GCP region can be read out upon seeking. Further, the CTL region records information indicative of media type or the like thereon. The TEST region allows test data to be recorded thereon.

FIG. 5 is a table concretely showing the format of the optical disk 4 shown in FIG. 4. As shown in FIG. 5, the GCP region on the uppermost column corresponds to the GCP region of the outermost periphery of the optical disk 4 shown in FIG. 4. The upper to lower columns correspond to regions ranging from the outermost periphery to the innermost periphery of the optical disk 4 shown in FIG. 4, respectively.

In this embodiment, a zone CAV (constant angular velocity) method will be described and data clocks are therefore different at every zone as shown in FIG. 5.

Sector formats will be described with reference to FIGS. 6A, 6B and 6C. FIGS. 6A, 6B, 6C show the contents of one sector. As earlier noted, if the optical disk 4 is the magneto-optical disk and the write-once disk or data is recorded on the writable region of the partial disk, then data constructing the following sector format are recorded by the optical disk drive 1 shown in FIG. 1. If the optical disk 4 or the read-only optical disk or data is recorded on the writable region of the partial disk, then data constructing the following sector format are recorded when the optical disk is manufactured.

In FIGS. 6A, 6B and 6C, reference symbol i depicts a line and j a byte. A solid arrow indicates a writing direction. Data shown by D0 to D2047 depict user data. Data shown by (P1, P2) to (P35, P36) depict parity-check codes for the user data D0 to D127, . . . , D1920 to D2047 shown by i=130 to 123, . . . , i=10 to 3. Data shown by (Q1, Q2) depicts parity-check codes for the parity-check codes P1 to P36. Data shown by (Q3, Q4) depict parity-check codes for the parity-check codes P1 to P36 and the parity-check codes (Q1, Q2). Data shown by CRC1 to CRC8 indicate error-checking parity-check codes for the user data D0 to D2047.

Data shown by (E1, 1) to (E16, 16) indicate Reed-Solomon code parity-check codes for the user data D0 to D2047 expressed by j=0 to j=15, the parity-check codes P1 to P36, Q1 to Q4 and CRC1 to CRC8. Specifically, the parity-check code of j=0 composed of parity-check codes (E1, 1) to (E1, 16) are parity-check codes for data D0, D16, . . . , D2032 and data expressed by j=0 and i=130 to 0. Data of j=1 and i=-1 to -16 composed of parity-check codes (E2, 1) to (E2, 16) are parity-check codes for data expressed by j=1 and i=130 to 0. Similar parity-check codes also are prepared for other lines.

As shown in FIGS. 6A, 6B and 6C, when the Reed-Solomon codes are arranged for data of respective lines shown by i=130 to -0, each distance becomes 17 as described above. Study of the table 1 reveals that, when errors occur continuously, 8 errors can be detected and corrected at maximum. However, when 9 errors or greater occurs continuously, they cannot be error-corrected.

In this embodiment, parity-check codes P1 to P36 are generated as error-checking and error-correcting 2nd ECC for data expressed as i=130, j=0 to i=3, j=15 and i=0, j=15 to i=-16 and j=15. They are used upon reproduction.

Since all data in the longitudinal direction are 147 bytes, data length in each longitudinal direction of user data D0 to D2047 which become parity-check codes is 131 bytes and data length in each longitudinal direction of parity-check code is 16 bytes, the distance becomes 17. Thus, the Reed-Solomon code is (147, 131, 17). Incidentally, one code word symbol is one byte.

One sector becomes 16 bytes×147=2352 bytes as described above.

FIG. 7 is a diagram used to explain a manner in which parity-check codes P1 to P36 are generated for data and parity-check codes shown in FIGS. 6A, 6B and 6C when the sector formats shown in FIGS. 6A, 6B, 6C are used if the optical disk 4 is the read-only disk or partial disk (with only ROM region).

As is understood from FIG. 7, parity-check codes are paired in such a way as in P1, P2. Parity-check codes (P1, P2) to (P35, P36) are parity-check codes for data of 8 line each. Parity-check codes (Q1, Q2) are parity-check codes for the parity-check codes P1 to P36. Parity-check codes (Q3, Q4) are parity-check codes for the parity-check codes P1 to P36 and the parity-check codes Q1 and Q2.

Specifically, when the parity-check codes P1 to P36 are generated, (130, 128, 3) Reed-Solomon code is formed; when the parity-check codes Q1, Q2 are generated, (38, 36, 3) Reed-Solomon code is formed; and when parity-check codes Q3, Q4 are generated, (40, 38, 3) Reed-Solomon code is formed.

Figure 8:
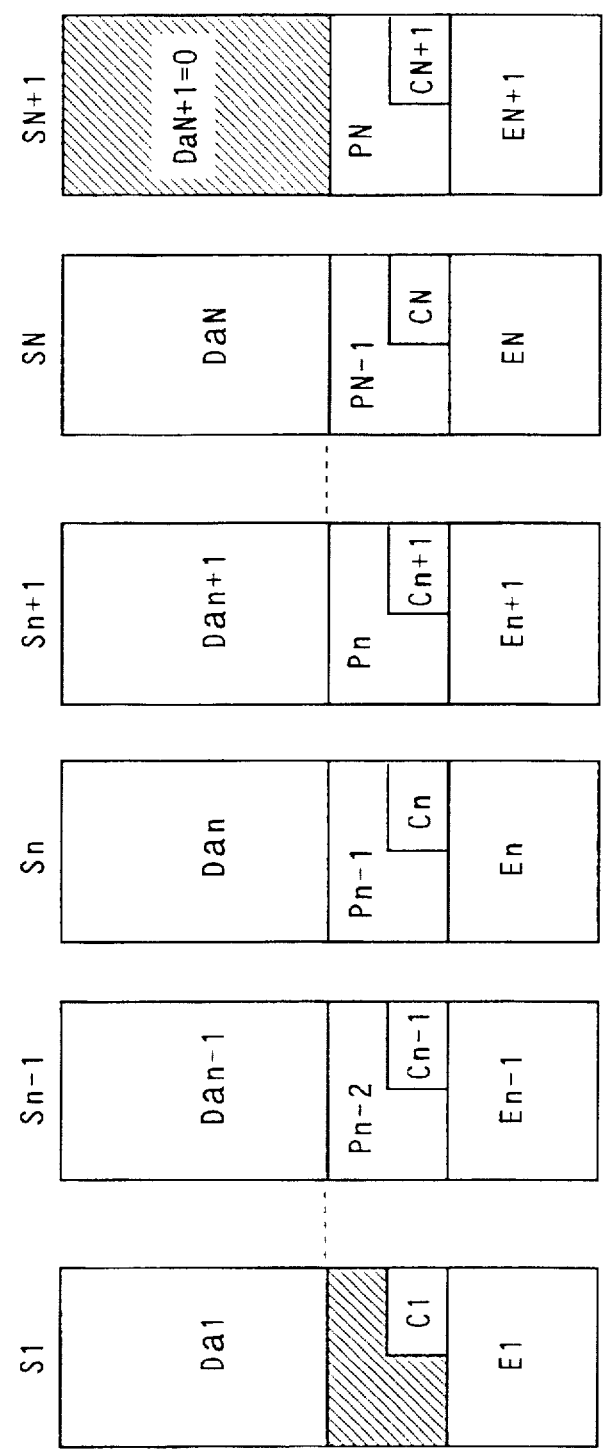
FIG. 8 is a diagram used to explain a manner in which parity-check codes used as 2nd ECC in the 8-line pattern of an optical disk (read-only disk and disk with readable regions) are recorded on other sectors.

FIG. 8 is a diagram used to explain a manner in which parity-check codes P1 to Pn (n is 40 at maximum) generated for data of the immediately-preceding sector are recorded on a particular region of each sector according to the sector formats shown in FIGS. 6A, 6B and 6C if the optical disk 4 is the read-only disk or partial disk (with only ROM region).

In FIG. 8, reference letters S1 to SN+1 depict sector Nos. The sector S1 depicts the starting sector obtained when a series of user data is recorded, the sector SN depicts the ending sector obtained when a series of user data is recorded, and the sector SN+1 depicts the added sector obtained when a series of user data is recorded.

Data shown by Da1 to DaN+1 depict user data, respectively and correspond to the data D0 to D2047 in FIGS. 6A, 6B and 6C, respectively. Data depicted by E1 to EN+1 are parity-check codes of user data Da1 to DaN+1 of the respective sectors S1 to SN+1, respectively. Data depicted by Pn to PN are parity-check codes used as 2nd ECC shown in FIGS. 6A, 6B, 6C and FIG. 7, respectively. Data depicted by C1 to CN+1 are error-checking parity-check codes, respectively, and which correspond to parity-check codes CRC1 to CRC8 in FIGS. 6A, 6B and 6C, respectively. The sector S1 is the starting sector used when a series of user data is recorded. An area shown hatched in the sector S1 is the starting sector and indicates that no parity-check code is recorded thereon. The reason for this will be described below.

In the codes shown in FIG. 8, values ranging from 1 to N+1 are supplementally added to the respective codes following the starting code. These values are corresponding to the sectors S1 to SN+1, respectively. The data Dan−1, for example, depicts user data recorded on the sector Sn−1. The parity-check code Cn−1 depicts parity-check code for error-checking the user data Dan−1 recorded on the sector Sn−1. The parity-check code En−1 depicts parity-check code for error-correcting the user data Dn−1 recorded on the sector Sn−1.

Of the specific region, the codes of parity-check codes used as the 2nd ECC shown in FIGS. 6A, 6B, 6C and FIG. 7 are added with codes different from that of the sector Sn−1, i.e., the value of immediately-preceding sector "n−2". The value "n−2" indicates the parity-check code generated from data Dan−2 of the preceding sector Sn−2. This is also true for other sectors shown in FIG. 8. A parity-check code Pn−1 of the specific region of the sector Sn, for example, is a parity-check code generated in the data Dan−1 of the sector Sn−1.

No parity-check code is recorded on the hatched area of a part of the specific region of the sector S1 but identification data (ID) indicative of the starting sector, e.g., fixed data (all "0"s, etc.) is recorded on the hatched area. The reason that no parity-check code is recorded on the sector S1 is that a parity-check code for the immediately-preceding sector of the sector S1 is not required because the sector S1 is the starting sector used when a series of user data is recorded.

All "0"s, for example, are recorded on the hatched region which is the data recording region of the sector SN+1. Accordingly, the error-checking parity-check code CN+1 is a 0-checking parity-check code recorded on this sector SN+1. A parity-check code EN+1 also is a parity-check code generated at "0" recorded on this sector SN+1. On the other hand, a parity-check code PN generated for the data DaN of the immediately-preceding sector SN is recorded on a partial region of the specific region.

The reason that the parity-check code PN generated from the data DaN of the immediately-preceding sector SN is recorded on the sector SN+1 will be described. That is, although the recording of the data itself is completed in the immediately-preceding sector SN, the parity-check code used as the 2nd ECC is recorded on the sector next to the sector in which data forming that parity-check code is recorded and a sector in which a parity-check code of the last data is recorded should be provided. Therefore, as shown in FIG. 8, if the last sector used when a series of user data is recorded is SN, then the parity-check code used as the 2nd ECC of the data DaN of the sector SN has to be recorded on the specific region of the sector SN+1 as an added sector. Since a data amount of a series of data is generally larger than a data amount of data of one track, it is more effective than having a parity-check code sector provided at every track from a processing efficiency standpoint.

Figure 9:
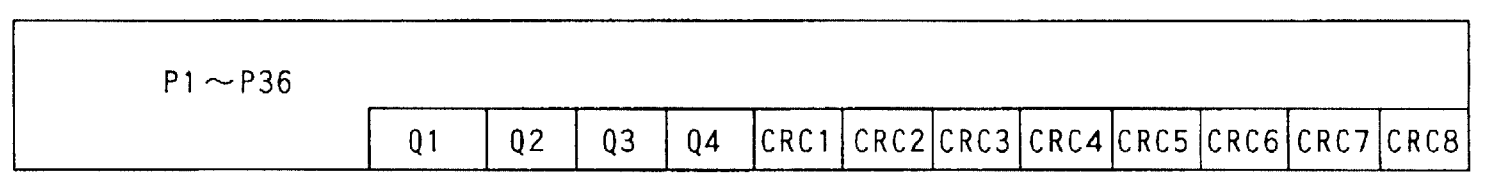

FIG. 9 is a diagram showing the specific region shown in FIG. 8 in an enlarged scale.

A specific region is assumed to be a N+1 sector for the sake of simplicity. In FIG. 9, P1 to P36 depict parity-check code-check codes used as 2nd ECC shown in FIGS. 6A, 6B, 6C and FIG. 7. As earlier noted, the parity-check codes P1 to P36 used as 2nd ECC become 36 bytes of 2 bytes each in total for 128 bytes (data of 8 lines×16) data of N sectors. Reference numerals Q1 and Q2 depict parity-check codes for the parity-check code data of totally 36 bytes composed of parity-check codes P1 to P36 of the specific region of the N+1 sector. Reference numerals Q3 and Q4 depict parity-check codes for data of totally 38 bytes of parity-check codes P1 to P36 and parity-check codes Q1 and Q2 of the N+1 sector.

Specifically, when data is recorded on the N+1 sector, parity-check codes (E1, 1) to (E16, 16) are generated from the data D0 to D2047 of the N sector, and error-checking parity-check codes CRC1 to CRC8 are generated. Further, the parity-check codes P1 to P36 and Q1 to Q4 used as the 2nd ECC generated from the user data D0 to D2047 of the N sector are recorded on the specific region of the N+1 sector.

Upon reproduction, the user data D0 to D2047 of the N sector are reproduced and the reproduced user data D0 to D2047 are error-corrected by use of the corresponding parity-check codes (E1, 1) and (E16, 16). When the reproduced user data cannot be error-corrected, the user data D0 to D2047 are error-checked by use of the parity-check codes CRC1 to CRC8. When the reproduced user data cannot be error-checked, the reproduced user data can be error-checked by use of the parity-check codes CRC1 to CRC8. If the error-checking becomes impossible, then the parity-check codes P1 to P36 and Q1 to Q4 used as the 2nd ECC are read out from the N+1 sector. Then, the error-checking is carried out by use of the parity-check codes P1 to P36 and Q1 to Q4 thus read out and erasure information is obtained. The erasure information indicates that data of line unit with erasure information is erased when errors occurred. By this erasure information, it is possible to recognize data that was erased by errors in the succeeding process.

Then, a syndrome of N sector data is calculated by using parity-check codes (E1, 1) to (E16, 16) of the user data D0 to D2047 of the N sector. Error position information is obtained on the basis of a calculated result and the erasure information and then a value of error is obtained. Data of N sector corresponding to the error position information is read out and the data of N sector is error-corrected by addition of the value of error.

Of the data shown in FIGS. 6A, 6B and 6C, if the data D0 through D120 are erroneous, then a burst error of 15 bytes or 16 bytes (>8 bytes) occurs in the parity-check code used as the 1st ECC. As a result, the error-detection and error-correction wherein the error position is detected and the detected error is corrected becomes impossible. Because, when the distance is "17" and the number of error detection is "0", only error of up to 8 symbols can be corrected.

Therefore, in this case, data D0 to D128, i.e., data of 8 lines are regarded as erasure data and error erasure information indicative of the position at which the error occurs is obtained by using the parity-check codes P1 and P2. If there exists the error erasure information, then the number of symbols that can be erased and corrected is expressed as d−1. Accordingly, if the distance d is 17, then data of 16 bytes can be erased and corrected.

As described above, the parity-check codes used as the 2nd ECC of the data recorded on a certain sector are recorded on a specific region of the next sector in the writable region of the magneto-optical disk, the write-once disk and the partial disk by the optical disk drive. Further, the parity-check codes are recorded on a specific region of the next sector in the read-only region of the read-only optical disk and the partial disk when optical disks are manufactured.

The above-mentioned format can be applied to any one of the writable regions of the magneto-optical disk, the write-once disk and the partial disk. However, almost all of the magneto-optical disks use a LRA (linear replacement algorithm) for recording data to be recorded on a defective sector on a sector of a replacement area of the defective sector if a defect occurs in the sector when the optical disk is in use and a SSA (sector slipping algorithm) for recording data to be recorded on a defective sector if a defect occurs in the sector when optical disks are manufactured. Therefore, if the optical disk has a defective sector, then data of the defective sector is recorded on the replacement sector so that the optical pickup has to be moved frequently. Thus, if the 2nd ECC is recorded on the next sector, then the access speed is lowered. To solve this problem, when data is recorded on the sector, the parity-check codes generated as the 2nd ECC are not recorded on the next sector but recorded on the corresponding sector.

In the following description, with respect to the read-only optical disk, the parity-check codes used as the 2nd ECC are recorded on the specific region of the next sector. With respect to the magneto-optical disk, the parity-check codes used as the 2nd ECC are not recorded on the next sector but its own sector, i.e., the sector in which data, from which the parity-check codes are generated, are recorded.

FIG. 10 is a table used to explain a manner in which the parity-check codes used as the 2nd ECC are used for the data and the parity-check codes shown in FIGS. 6A, 6B and 6C.

In FIG. 10, "line" corresponds to i shown in FIGS. 6A, 6B, 6C similarly to FIG. 7.

Study of FIG. 10 reveals that the parity-check codes (P1, P2) to (P31, P32) are parity-check codes for data of 8 lines. Moreover, the parity-check codes (Q1, Q2, Q3, Q4) are parity-check codes for the parity-check codes P1 to P32 and the parity-check codes Q1 to Q4.

Specifically, when the parity-check codes P1 to P32 are generated, (130, 128, 3) Reed-Solomon code is generated with respect to each line. When the parity-check codes Q1 to Q4 are generated, (36, 32, 5) Reed-Solomon code is formed. When the parity-check codes Q5 to Q8 are generated, (40, 36, 5) Reed-Solomon code is formed.

Figure 11:
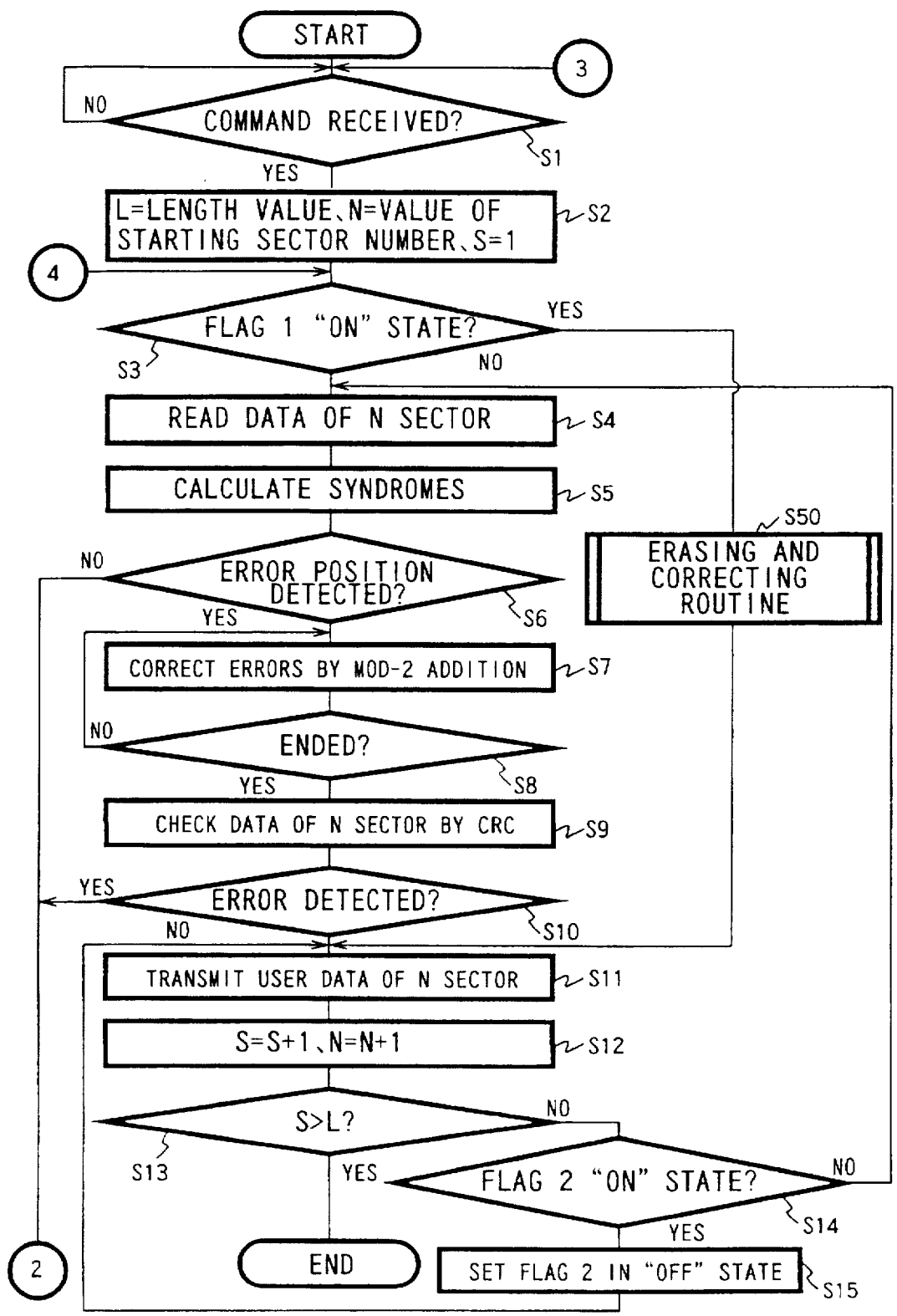
FIGS. 11 to 13 are flowchart used to explain a manner in which the optical disk drive process data upon reproduction.
Figure 12:
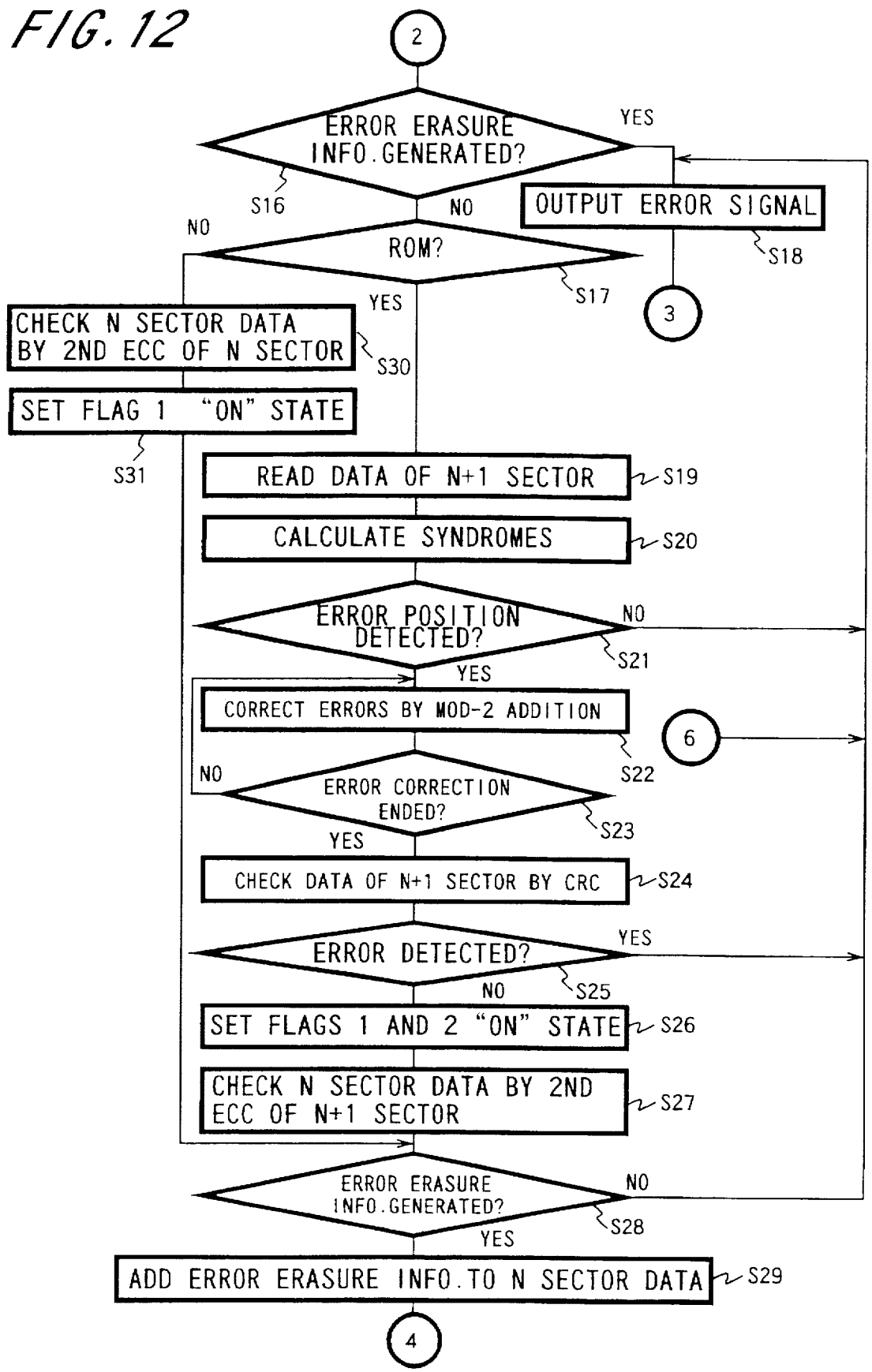
Figure 13:
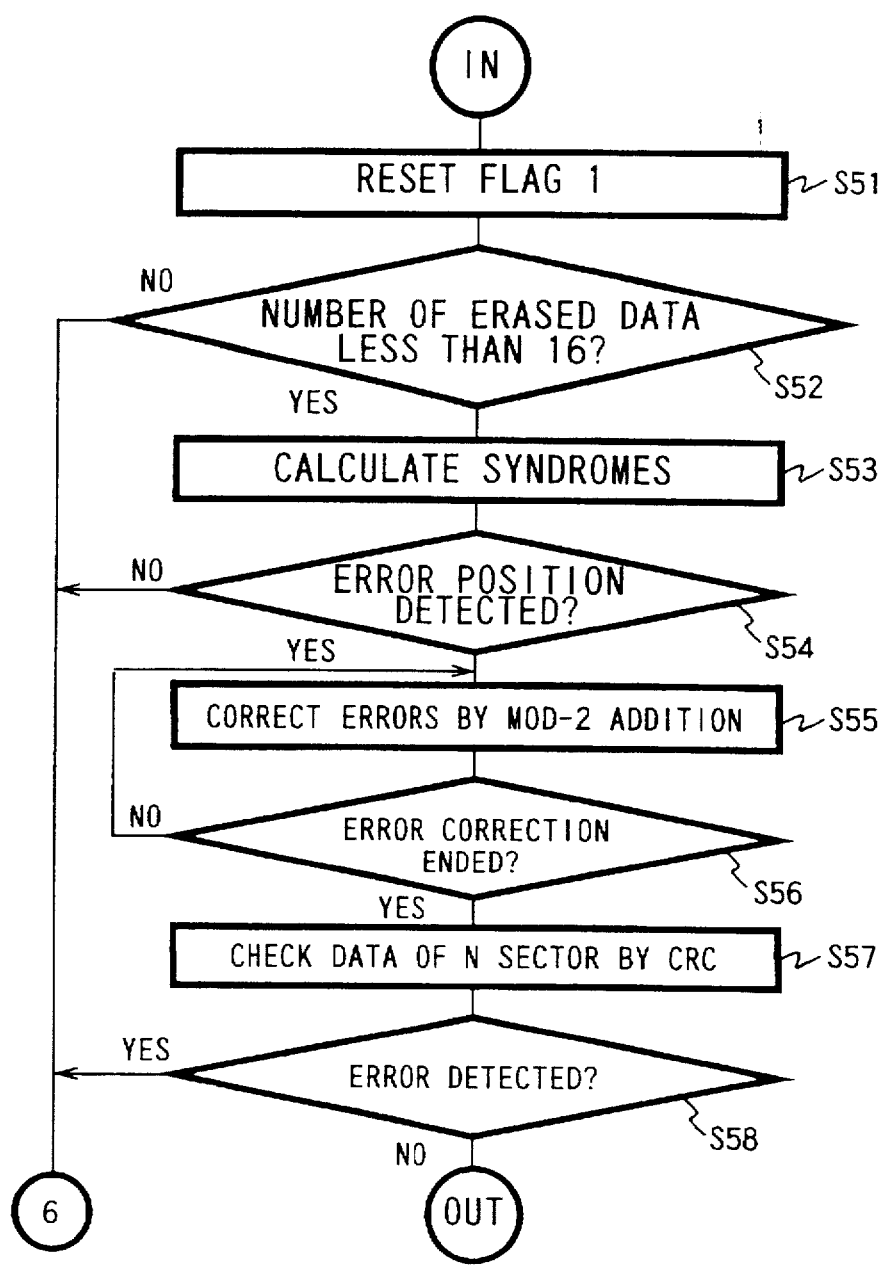

FIGS. 11 to 13 are flowcharts used to explain a manner in which the controller is operated upon reproduction. The CPU 60 and the RAM controller 67c shown in FIG. 3 are mainly used to control the operation.

A read command is composed of data indicative of reading, logical address data and length data. Upon reproduction, the host computer 3 (see FIG. 1) supplies the read command through the input terminal io1, the interface circuit 71 and the input and output port 64 to the CPU 60.

Referring to FIG. 11, following the start of operation, it is determined at decision step S1 whether or not the read command is supplied from the host computer 3 to the CPU 60. If a YES is output at decision step S1, then the processing proceeds to step S2.

In step S2, the CPU 60 extracts the length data from the read command and stores the extracted length data in an internal register L of the CPU 60. The CPU 60 stores starting sector No. data in an internal register S. Further, the CPU 60 stores data "1" in the internal register S. A value of data stored in the internal register S is incremented by "1" each time data of one sector is read and transmitted. The CPU 60 compares the value stored in the internal register S and the value stored in the internal register L. When the value stored in the internal register S is larger than the value stored in the internal register L, the CPU 60 recognizes that data of amount indicated by the length data has been finished being read out.

In the next decision step S3, the CPU 60 requests the decoder 67 to supply the flag 1 thereto. Then, it is determined whether or not the value of data of the flag 1 supplied from the decoder 67 is a value indicative of "ON" state. If a YES is output at decision step S3, then the processing proceeds to step S50. If a NO is output at decision step S3, then the processing proceeds to step S4. The flag 1 is in its ON-state at steps S26 and S31 which will be described later on, i.e., the flag 1 is in its ON-state when the data of N sector cannot be error-corrected by the ECC of that sector and can be erased and corrected by the 2nd ECC of the N+1 sector.

In step S4, the CPU 60 supplies the read command to the digital signal processor 53 shown in FIG. 2. The digital signal processor 53 controls the optical block 8 such that the position of the optical block 8 shown in FIG. 1 coincides with the target position on the magneto-optical disk 4. Thus, data of N sector is read out from the optical disk 4. The data of N sector read out from the optical disk 4 is supplied through the read/write circuit 38 and the input terminal 65 to the switch 66. The CPU 60 supplies the switching control signals to the switches 66, 69 so that the switches 66, 69 connect the movable contacts 66c, 69c to the fixed contacts 66a, 69a. As a consequence, reproduced data supplied to the switch 66 is supplied through the switch 66 to the decoder 67.

In step S5, the RAM controller 67c reads out data of j=0 to 15 and i=130 to 0 stored in the RAM 67a from the RAM 67a in the sequential orders shown in FIGS. 6A, 6B and 6C.

Simultaneously, the parity-check codes (E1, 1) to (E16, 16) corresponding to these data of longitudinal direction also are read out sequentially. Then, the RAM controller 67c calculates syndromes with respect to data of j=0 to 15 and i=130 to 0 by use of the corresponding parity-check codes (E1, 1) to (E16, 16).

It is determined in the next decision step S6 whether or not the error position can be detected. If a YES is output at decision step S6, then the processing proceeds to step S7. If a NO is output at decision step S6, then the processing proceeds to step S16 (see FIG. 12). Since the number of symbols that can be error-detected is "8" as earlier noted, if the number of consecutive errors is less than 8 bytes, then the error position can be detected.

In the next step S7, the RAM controller 67c calculates the value of error and reads out data with error from the RAM 67a. The RAM controller 67c error-corrects the data with the error read out from the RAM 67a by addition of the above error value (modulo-2 addition). The RAM controller 67c writes the error-corrected data in the original region of the RAM 67a.

In the next decision step S8, it is determined whether or not the RAM controller 67c has finished error-correcting all data with errors. If a YES is output at decision step S8, then the processing proceeds to step S9. If on the other hand a NO is output at decision step S8, then the processing returns to step S7 and steps S7 and S8 are repeated.

In step S9, the RAM controller 67c reads out the data of N sector from the RAM 67a and also reads out the parity-check codes CRC1 to CRC8 for checking the errors of N sector. The RAM controller 67c error-checks the data of N sector by use of the error-checking parity-check codes CRC1 to CRC8.

It is determined in the next decision step S10 on the basis of the results obtained when the RAM controller 67c error-checks the data of N sector by use of the error-checking parity-check codes CRC1 to CRC8 whether or not data has errors. If a YES is output at decision step S10, then the processing proceeds to step S16. If on the other hand a NO is output at decision step S10, then the processing proceeds to step S11.

In step S11, the CPU 60 supplies a control signal indicative of starting reading data stored in the RAM 67a to the RAM controller 67c, whereby the RAM controller 67c supplies the read control signal to the RAM 67a so that the user data of N sector starts being read out from the RAM 67a. The user data of N sector read out from the RAM 67a is supplied through the switch 69 to the buffer 70, whereafter it is held temporarily and supplied through the interface circuit 71 and the input and output terminal io1 to the host computer 3 shown in FIG. 1.

In step S12, the CPU 60 adds "1" to the data stored in the internal registers S and L.

It is determined in decision step S13 by the CPU 60 whether or not the value of the data stored in the internal register S is larger than the value of the data stored in another internal register L. If a YES is output at decision step S13, then the processing is ended. If on the other hand a NO is output at decision step S13, then the processing proceeds to the next decision step S14. In decision step S14, it is determined whether or not data of all sectors have finished being reproduced.

In step S14, the CPU 60 requests the decoder 67 to supply a flag 2 thereto. Then, it is determined whether or not the value of data of the flag 2 is "ON". If a YES is output at decision step S14, then the processing proceeds to step S15.

If a NO is output at decision step S14, then the processing returns to step S4. The flag 2 is in its ON-state at step S26 which will be described later on. If the data of the N+1 sector cannot be error-corrected by the ECC of the corresponding sector and can be erased and corrected by the 2nd ECC of the N+1 sector, then the data of the N+1 sector was already read and stored in the RAM 67b. Therefore, in order to prevent the data of the N+1 sector from being read out one more time but to transmit the data of the N+1 sector at it is, the flag 2 is used to determine whether to read the data of N+1 sector or whether to transmit the data of N+1 sector stored in the RAM 67b. In step S15, the RAM controller 67c changes the value of the flag 2 to a value indicative of "OFF" state.

In the next decision step S16, the CPU 60 requests the RAM controller 67c to supply the erasure information thereto. If the error erasure information exists, then the RAM controller 67c supplies the error erasure information to the CPU 60 as an error signal. It is determined by the CPU 60 on the basis of the data supplied thereto from the RAM controller 67c whether or not the error erasure information exists. If a YES is output at decision step S16, then the processing proceeds to step S18. If a NO is output at decision step S16, then the processing proceeds to the next decision step S17.

In the decision step S17, the CPU 60 reads disk type data indicating types of disks, such as the read-only disk, i.e., ROM, the rewritable disk, i.e., RAM read out from the optical disk and held in the RAM 62 when the optical disk is loaded on the apparatus. Then, it is determined by the CPU 60 on the basis of the disk type data whether the optical disk is ROM. If a YES is output at decision step S17, then the processing proceeds to step S19. If on the other hand a NO is output at decision step S17, then the processing proceeds to step S30. If the optical disk is the RAM, then the 2nd ECC for the user data of N sector is recorded on the specific region of the N sector. If the optical disk is the ROM, then the 2nd ECC for the user data of the N sector is recorded on the specific region of the N+1 sector. Therefore, it is determined at decision step S17 whether the optical disk is the ROM or RAM. Then, in accordance with the judged result, a different processing is carried out. Specifically, if the optical disk is the RAM, then data of 2nd ECC is read out from the N sector. If on the other hand the optical disk is the ROM, then the 2nd ECC is read out from the N+1 sector.

In the case of the write-once disk, although the disk type data indicates the write-once disk, the write-once disk is judged as the ROM at decision step S17.

In step S18, the CPU 60 supplies an error signal from the RAM controller 67 to the interface circuit 71. When the error signal is supplied to the interface circuit 71, the interface circuit 71 supplies the error signal through the input and output terminal io1 to the host computer 3 shown in FIG. 1. The software activated on the host computer 3 allows image indicative of the error signal to be displayed on the monitor screen of the host computer 3 when the error signal is supplied to the host computer 3.

In step S19, the CPU 60 supplies the read command signal to the digital signal processor 53 shown in FIG. 2. The digital signal processor 53 controls the optical block 8 such that the position of the optical block 8 shown in FIG. 1 becomes coincident with the target position on the magneto-optical disk 4. Thus, the data of the N+1 sector is read out from the optical disk 4. The data of the N+1 sector read out from the optical disk 4 is supplied through the read/write circuit 38 and the input and output terminal 65 to the switch 66. The CPU 60 supplies switching control signals to the switches 66, 69 so that the switches 66, 69 connect the movable contacts 66c, 69c to the fixed contacts 66a, 69a. As a result, the reproduced data supplied to the switch 66 is supplied through the switch 66 to the decoder 67.

In the next step S20, the RAM controller 67c sequentially reads out the data of N sector stored in the RAM 67b and also sequentially reads out the parity-check codes (E1, 1) to (E16, 16) corresponding to these data. Then, the RAM controller 67c calculates syndromes of the data of the N+1 sector by use of the corresponding parity-check codes (E1, 1) to (E16, 16) sequentially.

It is determined in the next decision step S21 by the RAM controller 67c whether or not the error position can be detected. If a YES is output at decision step S21, then the processing proceeds to the next step S22. If on the other hand a NO is output at decision step S21, then the processing proceeds to step S18.

In step S22, the RAM controller 67c calculates the value of error and reads out data with error from the RAM 67b. The RAM controller 67c error-corrects the data with the error read out from the RAM 67b by addition (modulo-2 addition) of the value of error to the data with the error. Then, the RAM controller 67c writes the error-corrected data in the original region of the RAM 67b.

It is determined in the next decision step S23 by the RAM controller 67c whether or not all data with errors are error-corrected. If a YES is output at decision step S23, then the processing proceeds to step S24. If on the other hand a NO is output at decision step S23, then the processing returns to step S22 and steps S22 and S23 are repeated.

In step S24, the RAM controller 67c reads out the data of the N+1 sector from the RAM 67b and also reads out the error-checking parity-check codes CRC1 to CRC8. Then, the RAM controller 67c error-checks the data of the N+1 sector by use of the error-checking parity-check codes CRC1 to CRC8.

It is determined in decision step S25 by the RAM controller 67c on the basis of the results of error-checking using the error-checking parity-check codes whether or not there are errors. If a YES is output at decision step S25, then the processing proceeds to the step S18. If a NO is output at decision step S25, then the processing proceeds to the next step S26.

The reason that the CPU 60 supplies the error signal from the RAM controller 67c through the interface circuit 71 and the input and output terminal io1 to the host computer 3 is that an error which cannot be corrected by the data existing within the sector occurred in the data read out from the N+1 sector.

In step S26, the RAM controller 67c sets the values of the flag 1 and the flag 2 in the ON-state, respectively. The flag 1 and the flag 2 are respectively set in the ON-state when the error position can be detected and the occurrence of error is not detected by error-checking using the CRC code.

In step S27, the RAM controller 67c reads out the user data of the N sector at every 8 lines from the RAM 67a as in a manner of j=0 and i=130 to 123 and also reads out the parity-check codes (P1 to P2) to (P35, P36) used as the 2nd ECC of the N+1 sector corresponding to the data of 8 lines from the RAM 67b. Then, the RAM controller 67c error-checks data of the N sector by the 2nd ECC of the N+1 sector with respect to the user data of 8 lines. Error erasure information for the N sector can be obtained by error-checking.

It is determined in decision step S28 by the RAM controller 67c on the basis of error-checked results using the 2nd ECC whether or not error erasure information is obtained. If a YES is output at decision step S28, then the processing proceeds to step S29. If on the other hand a NO is output at decision step S28, then the processing returns to the step S18. If the error erasure information is not obtained, then the occurrence of error cannot be detected even though the error occurred. Therefore, in this case, even the error cannot be detected and the processing returns to the step S18, whereat the error signal is output.

The reason that, if a NO is output at decision step S28, then the processing returns to the step S18, whereat the CPU 60 supplies the error signal supplied thereto from the RAM controller 67c through the interface circuit 71 and the input and output terminal io1 to the host computer 3 will be described below. When an error which cannot be corrected occurs in data read out from the N sector, the 2nd ECC is read out from the N+1 sector and the error erasure information is obtained by error-checking data of the N sector by use of the 2nd ECC. Subsequently, when an error is corrected by using the 1st ECC, an error that cannot be corrected within the sector occurs in the data of the N+1 sector. Therefore, in such case, an error signal indicative of the occurrence of error is supplied to the host computer 3.

In step S29, the RAM controller 67c writes the error erasure information for the N sector obtained at step S27 in the RAM 67a. That is, the RAM controller 67c adds the error erasure information to the data of the N sector.

If a NO is output at decision step S17, then the processing proceeds to step S30. In step S30, the RAM controller 67c reads out the user data of the N sector from the RAM 67a at every 8 lines as in a manner of j=0 and i=130 to 123 and also reads out the parity-check codes (P1 to P2) to (P35, P36) used as the 2nd ECC of the N sector corresponding to data of 8 lines each. Then, the RAM controller 67c error-checks the user data of 8 lines each of N sector by use of the 2nd ECC of the N sector. The error erasure information for the N sector is obtained by this error-checking. Then, the processing proceeds to the next step S31.

In step S31, the RAM controller 67c adjusts the value of the flag data to be a value indicative of the ON-state of the flag.

The erasing and correcting routine shown in FIG. 11 will be described with reference to a flowchart of FIG. 13.

In step S51, the RAM controller 67c adjusts the value of flag 1 to be a value indicative of the OFF-state of the flag.

It is determined in the next decision step S52 by the RAM controller 67c whether or not data of the N sector erased by errors is less than 16 bytes. If a YES is output at decision step S52, then the processing proceeds to step S53. If a NO is output at decision step S52, then the processing returns to the step S18.

In step S53, the RAM controller 67c sequentially reads out data of the N sector stored in the RAM 67a and also sequentially reads out the parity-check codes (E1, 1) to (E16, 16) corresponding to these data. Then, the RAM controller 67c sequentially calculates syndromes of the data of the N sector by use of the corresponding parity-check codes (E1, 1) to (E16, 16).

It is determined in the next decision step S54 by the RAM controller 67c whether or not the error position can be detected. If a YES is output at decision step S54, then the processing proceeds to the next step S55. If on the other hand a NO is output at decision step S54, then the processing returns to the step S18.

In step S55, the RAM controller 67c calculates a value of error and then reads out data with an error occurred therein from the RAM 67a. Then, the RAM controller 67c error-corrects the data with the error occurred therein by adding (modulo-2 addition) the value of the error. The RAM controller 67c writes the error-corrected data in the original region of the RAM 67a.

It is determined in the next decision step S56 by the RAM controller 67c whether or not all data with errors occurred therein have been finished being error-corrected. If a YES is output at decision step S56, then the processing proceeds to the next step S57. If a NO is output at decision step S56, then the processing returns to the step S55.

In step S57, the RAM controller 67c reads out the data of the N sector from the RAM 67a and also reads out the error-checking parity-check codes CRC1 to CRC8 from the RAM 67a. Then, the RAM controller 67c error-checks the data of the N sector by use of the error-checking parity-check codes CRC1 to CRC8.

It is determined in the next decision step S58 by the RAM controller 67c on the basis of error-checked results using the error-checking parity-check codes CRC1 to CRC8 whether or not errors exist. If a YES is output at decision step S58, then the processing returns to the step S18. If on the other hand a NO is output at decision step S58, then the processing returns to the step S11.

As described above, according to this embodiment, upon recording, the parity-check codes (E1, 1) to (E16, 16) used as the 1st ECC and the error-checking parity-check codes CRC1 to CRC8 are generated from the user data D0 to D2047 of the N sector and these parity-check codes are recorded together with the user data D0 to D2047 of the N sector on the N sector. Simultaneously, the parity-check codes P1 to P36 and Q1 to Q4 (or P1 to P32 and Q1 to Q8) used as the 2nd ECC are generated from the user data D0 to D2047 of the N sector. These parity-check codes are recorded on the specific region of the N+1 sector.

Upon reproduction, the user data D0 to D2047 of the N sector are error-corrected by use of the 1st ECC. If the error position cannot be detected by use of the parity-check codes (E1, 1) to (E16, 16) used as the 1st ECC or an error is detected when an error is checked by the CRC code, then the error erasure information is obtained by error-checking the data by use of the parity-check codes P1 to P36 and Q1 to Q4 used as the 2nd ECC recorded on the specific region of the N+1 sector. If the number of data erased by errors is less than 16, then syndromes of the data of the N sector are calculated by use of the parity-check codes (E1, 1) to (E16, 16) of the N sector. Then, error position information is obtained on the basis of the calculated results of the syndromes and the error erasure information. Subsequently, the value of error is calculated. The data of N sector is read out on the basis of the error position information and data with error occurred therein is corrected by adding (modulo-2 addition) the value of error to the data of the N sector.

Accordingly, the ordinary high-speed processing (e.g., processing for reproducing data at high speed by use of cache) and the real time processing (e.g., processing for reproducing a real moving picture) can be carried out in a usual manner. Further, if the parity-check codes used as the 2nd ECC are used, then data can be reproduced with high reliability and the reliability of reproduced data can be improved when an abnormality such as a burst error occurs. This becomes particularly effective in the read-only disk such as read-only optical disk where the alternate processing based on LRA or SSA cannot be carried out. Also, this becomes effective in the rewritable disk such as the magneto-optical disk when the LRA and SSA cannot be used because the high-speed processing is requested.

With respect to the read-only regions of the read-only optical disk and the partial disk, the parity-check codes used as the 2nd ECC are recorded on the particular region of the sector next to the sector in which data used to generate the parity-check codes are recorded. With respect to the writable regions of the magneto-optical disk, the write-once disk and the partial disk, the parity-check codes used as the 2nd ECC are recorded on the particular region of the sector in which data used to generate the parity-check codes are recorded. Therefore, the single optical disk drive can use the writable disk, the read-only disk, and the disk with writable and read-only regions.

FIG. 14 is a diagram used to explain a manner in which the parity-check codes used as the 2nd ECC are used for the data and the parity-check codes shown in FIGS. 6A, 6B, 6C when the 7-line 8-line 7-line pattern is used in the sector formats shown in FIGS. 6A, 6B and 6C.

While the parity-check codes used as the 2nd ECC are generated with respect to data of 8 lines as described above, as shown in FIG. 14, the 7-line 8-line 7-line pattern can be applied to the read-only optical disk.

As is clear from FIG. 14, respective parity-check codes are paired like P1, P2, for example. The parity-check codes (P1, P2) to (P39 to P40) are parity-check codes used for the data of 7 lines or 8 lines.

Specifically, when the parity-check codes P1 to P40 are generated, (114, 112, 3) Reed-Solomon code, (130, 128, 3) Reed-Solomon code and (114, 112, 3) Reed-Solomon code are formed one after another.

As described above, according to the second embodiment, when the parity-check codes P1 to P40 are generated, (114, 112, 3) Reed-Solomon code, (130, 128, 3) Reed-Solomon code and (114, 112, 3) Reed-Solomon code are alternately formed. Therefore, even when the burst error occurs, there are only a pair of 7 lines and 8 lines and a pair of 7 lines and 7 lines. Also, addition of 7 lines and 8 lines makes 15 lines in total and the distance d has a spare of "2". Addition of 7 lines and 7 lines makes 14 lines in total and the distance d has a spare of "3". In other words, errors can be checked with the spare of the distance as compared with the 8-line pattern of the read-only disk and the read-only region shown in FIG. 7. Therefore, data can be protected from errors with higher reliability.

FIG. 15 is a table used to explain a manner in which the RAM such as the magneto-optical disk uses parity-check codes for the data and the parity-check codes shown in FIGS. 6A, 6B and 6C according to the sector formats shown in FIGS. 6A, 6B, 6C when the 7-line 8-line 7-line pattern shown in FIG. 14 is used.

While the parity-check codes used as the 2nd ECC are generated with respect to data of 8 lines as described above, as shown in FIG. 15, the 7-line 8-line 7-line pattern can be applied to the rewritable disk such as the magneto-optical disk.

As is clear from FIG. 15, the parity-check codes are paired like P1, P2, for example. The parity-check codes (P1, P2) to (P35, P36) are parity-check codes for 7 lines or 8 lines. The parity-check codes (Q1, Q2) are parity-check codes for the parity-check codes P1 to P36. The parity-check codes (P3, P4) are parity-check codes for the parity-check codes P1 to P36 and the parity-check codes Q1 and Q2.

Specifically, when the parity-check codes P1 to P36 are generated, (114, 112, 3) Reed-Solomon code, (130, 128, 3)

Reed-Solomon code and (114, 112, 3) Reed-Solomon code are formed alternately. (114, 112, 3) Reed-Solomon code, (1300, 128, 3) Reed-Solomon code and (50, 48, 3) Reed-Solomon code are generated finally. Then, when the parity-check codes Q1 to Q4 are generated, (40, 36, 5) Reed-Solomon code is formed.

Therefore, even when the burst error occurs, there are only the pair of 7 lines and 8 lines and the pair of 7 lines and 7 lines. The 7 lines and the 8 lines makes 15 lines in total and the distance has a spare "2". Further, the 7 lines and the 7 lines makes 14 lines in total and the distance has a spare "3". In other words, an error can be checked with the spare of the distance as compared with the 8-line pattern of the rewritable disk and the rewritable region shown in FIG. 10. Therefore, data can be protected from error with higher reliability.

While the parity-check codes used as the 2nd ECC generated by the data of the sector SN with last data recorded therein when a series of data shown in FIG. 8 are recorded are recorded in a specific region of the sector SN+1 used as an added sector as described above, the parity-check codes used as the 2nd ECC of the sector Sn and the checking parity-check codes CRC1 to CRC8 may be recorded on other region of the sector SN+1.

While the data recording region of the sector SN+1 is held at all "0"s as described above, if the parity-check codes used as the 2nd ECC and the checking parity-check codes CRC1 to CRC8 are recorded on this recording region, then this data recording region need not be held at all "0"s but the optical disk drive can recognize that the sector SN+1 is the added sector.

With the above-mentioned arrangement, the above effects can of course be remarkably achieved in addition to the effects shown in the first embodiment.

While the data recording region of the sector SN+1 used as the added sector shown in FIG. 8 is held at all "0"s as described above, simple parity-check codes of respective data ranging from the sector 1 to the sector SN may be recorded in this recording region. In this case, an error can be corrected by use of these simple parity-check codes and data can be protected from error with higher reliability. The simple parity-check codes are added results which result from adding all user data. Upon reproduction, this parity-check code is compared with the added results of the user data added with the parity-check codes. Because, if an error does not occur, then the added results which are obtained by adding the user data upon reproduction become equal to the values of the parity-check codes.

With the above-mentioned arrangement, the above effects can of course be remarkably achieved in addition to the effects shown in the first embodiment.

While the parity-check codes Q1 and Q2 recorded on the specific region are assigned to the parity-check codes for 36-byte data of all parity-check codes of the specific region of the preceding sector and the parity-check codes Q3 and Q4 are assigned to 38-byte data of the parity-check codes P1 to P36 of this sector and the parity-check codes Q1 and Q2 when the optical disk 4 is the read-only disk and the partial disk (only the ROM region) as described above, the parity-check codes Q1 to Q4 may be assigned to the parity-check codes for 36-byte data of all parity-check codes in the specific region of the preceding sector.

In this case, since the 4-byte parity-check codes Q1 to Q4 are used for the parity-check codes P1 to P36, data can be protected from error with higher reliability as compared with the 2-byte parity.

With the above-mentioned arrangement, the above effects can of course be remarkably achieved in addition to the effects shown in the first embodiment.

While no parity-check codes are generated for all data of i=2 to 0 as described above, the present invention is not limited thereto and parity-check codes may be generated with respect to all data of i=2 to 0.

However, when the parity-check codes P33 and P34 are generated, leading data of 80 bytes have to be set to all "0"s because the whole bytes of i=2 to 0 are only 48 bytes and other parity-check codes are generated with respect to data of 128 bytes.

Specifically, when the parity-check codes P1 to P38 are generated, (130, 128, 0) Reed-Solomon code is formed. When the parity-check codes Q1 and Q2 are generated, (40, 38, 3) Reed-Solomon code is generated.

Therefore, since the parity-check codes are assigned to all data of the specific region, data can be protected from error with higher reliability.

With the above-mentioned arrangement, the above effects can of course be remarkably achieved in addition to the effects shown in the first embodiment.

While the sector is formed as the variable-length sector wherein the starting portion and the ending portion are determined by a series of recording data as described above, the present invention is not limited thereto and the sector may be formed as the fixed-length sector such as the block unit and the cluster unit.

In this case, since the sector is formed as the fixed-length sector, the number of sectors to be processed becomes always constant, the processing can be simplified.

With the above-mentioned arrangement, the above effects can of course be remarkably achieved in addition to the effects shown in the first embodiment.

While the parity-check codes used as the 2nd ECC generated with respect to the data of N sector are recorded on the specific region of the N+1 sector as described above, the present invention is not limited thereto and the even-numbered sector and the odd-numbered sector may be replaced with each other. For example, the parity-check codes P1, P2 of the data D0 to D127 of the even-numbered sector may be recorded on specific regions of the even-numbered sector and the parity-check codes P1, P2 of the data D0 to D127 of the even-numbered sector may be recorded on specific regions of the odd-numbered sector.

In this case, since the particular region of the leading sector used when a series of data are recorded need not be set to all "0"s (or fixed data is recorded) and the specific region of the added sector need not be set to all "0"s, a recording capacity of one sector can be saved and an extra processing such as when the specific region is set to all "0"s need not be carried out.

With the above-mentioned arrangement, the above effects can of course be remarkably achieved in addition to the effects shown in the first embodiment.

Furthermore, while the reproduced user data, the user data error-corrected by the 1st ECC or the user data obtained when data was error-checked by the 2nd ECC and erasure information-corrected by the 1st ECC are checked by the CRC1 to CRC8 as described above, the present invention is not limited thereto and the 1st ECC and the 2nd ECC also may be checked by the CRC1 to CRC8. In this case, an error detection capability can be improved much more.

INDUSTRIAL APPLICABILITY

The data recording/reproducing method, the data reproducing apparatus and the recording medium according to the present invention can be suitably applied to the optical disk drive, for example. Even when a burst error occurs, the present invention can efficiently execute the processing and can satisfactorily reproduce data without reduction of data recording capacity.

We claim:

1. A data recording method comprising the steps of:
   (a) generating a first error-correcting code with respect to a series of data of a predetermined amount;
   (b) generating a second error-correcting code with respect to said series of data of said predetermined amount;
   (c) generating data of respective recording units by adding said first error-correcting code to said data of said predetermined amount from which said first error-correcting code is generated and by adding said second error-correcting code to data of said predetermined amount other than said data of said predetermined amount from which said second error-correcting code is generated; and
   (d) recording said data of said respective recording units on a recording medium.

2. A data recording method according to claim 1, wherein data of a second recording unit including said second error-correcting code concerning data of said predetermined amount included in data of a first recording unit is recorded at a recording position next to a recording position of data of said first recording unit in said step (d).

3. A data recording method according to claim 2, wherein data of said second recording unit is generated by adding identification data to said second error-correcting code concerning last data of said predetermined amount in a series of a plurality of data of said predetermined amount as data of said predetermined amount in said step (c).

4. A data recording method according to claim 2, wherein identification data is added to leading data of said predetermined amount in a series of a plurality of data of said predetermined amount in place of said second error-correcting code in said step (d).

5. A data recording method according to claim 1, further comprising a step of generating an error-check code for said series of data of said predetermined amount and wherein data of said recording unit is generated by adding said error-check code to relating data of said predetermined amount.

6. A data recording method comprising the steps of:
   with respect to a rewritable first recording medium:
      generating a first error-correcting code for a series of respective data of predetermined amount;
      generating a second error-correcting code for said series of respective data of said predetermined amount;
      generating data of respective recording units by adding said first error-correcting code to relating data of said predetermined amount and by adding said second error-correcting code to data of said predetermined amount other than said relating data of said predetermined amount; and
      recording data of said respective recording units on a recording medium;
   and with respect to a second recording medium that cannot be rewritten:
      generating said first error-correcting code for a series of respective data of said predetermined amount;
      generating said second error-correcting code for said series of respective data of said predetermined amount;
      generating data of respective recording units by adding said first error-correcting code and said second error-correcting code to relating data of said predetermined amount; and
      recording data of said respective recording units.

7. A data reproducing method comprising the steps of:
   (a) reproducing data of the certain recording unit from a recording medium with data of respective recording units recorded therein, said data of respective recording units generated by adding a first error-correcting code generated with respect to a series of data of a predetermined amount to said data of said predetermined amount and by adding a second error-correcting code generated with respect to a series of data of said predetermined amount to data other than said data of said predetermined amount;
   (b) detecting on the basis of said first error-correcting code contained in reproduced data of said certain recording unit whether or not data can be error-detected and error-corrected;
   (c) error-detecting and error-correcting said data if said data can be error-detected and error-corrected;
   (d) generating lost information on the basis of said second error-correcting code corresponding to said data of said certain recording unit when said data cannot be error-detected and error-corrected, said second error-correcting code concerning said data of a certain recording unit reproduced from said recording units; and
   (e) erasing and correcting said data of said certain recording unit by use of said erasure information and said first error-correcting code.

8. A data reproducing method according to claim 7, further comprising a step (f) of error-checking data error-detected and error-corrected at said step (c) on the basis of an error-detecting code of a recording unit, said error-detecting code concerning data included in said recording unit being added to said data of said respective recording units.

9. A data reproducing method according to claim 8, wherein said step (d) is executed when an error is detected at said step (f).

10. A data reproducing method according to claim 7, further comprising a step (g) for error-checking data erasure-error-corrected at said step (e) on the basis of an error-detecting code of said recording unit, said error-detecting code for data included in said recording unit being added to data of said recording unit.

11. A data reproducing method according to claim 7, wherein said step (d) is composed of steps of reproducing data of said recording unit amount from a recording unit in which said second error-correcting code corresponding to said data of said certain recording unit is included, error-checking reproduced data of said recording unit amount by said error-detecting code included in said reproduced data of said recording unit amount, and generating erasure information for said data of the certain recording unit by said second error-correcting code corresponding to said data of said certain recording unit when an error is not detected by said error-detecting code.

12. A data reproducing apparatus comprising:
   reproducing means for reproducing data at a recording unit from a recording medium with data of respective recording units recorded thereon, each said data of respective recording units being generated by adding a first error-correcting code generated with respect to a series of data of a predetermined amount to data of said predetermined amount from which said first error-correcting code is generated and by adding second error-correcting code generated with respect to said series of said data of said predetermined amount to data of said predetermined amount other than said data of said predetermined amount from which said second error-correcting code is generated; and
   error-correcting means for detecting on the basis of said first error-correcting code contained in reproduced data of a certain recording unit whether or not errors can be detected and corrected, detecting and correcting said errors if said errors can be detected and corrected, generating erasure information on the basis of said second error-correcting code corresponding to said data of said certain recording unit reproduced from a recording unit which contains said second error-correcting code corresponding to said data of said certain recording unit if said errors cannot be detected and corrected, and erasing and correcting said data of said certain recording unit by use of said erasure information and said first error-correcting code.

13. A data recording apparatus according to claim 12, wherein said data of said certain recording unit is added with an error-detecting code with respect to data contained in said certain recording unit and said error-correcting means error-checks said detected and corrected data on the basis of the error-detecting code of said recording unit.

14. A data reproducing apparatus according to claim 13, wherein said error-correcting means generates erasure information on the basis of said second error-correcting code corresponding to said data of said certain recording unit reproduced from a recording unit which contains said second error-correcting code corresponding to said data of said certain recording unit when errors are detected by said error-checking and erases and corrects said data of said certain recording unit by use of said erasure information and said first error-correcting code.

15. A data reproducing apparatus according to claim 12, wherein an error-detecting code for error-detecting data contained in said certain recording unit are added to said data of said certain recording unit and said error-correcting means error-checks said erased and corrected data on the basis of said error-detecting code of said certain recording unit.

16. A data reproducing apparatus according to claim 12, wherein said error-correcting means error-checks data of said recording unit reproduced from said recording unit which contains said second error-correcting code corresponding to said data of said certain recording unit by an error-detecting code contained in reproduced data of said recording unit which contains said second error correcting code if errors cannot be detected and corrected, and generates erasure information for said data of said certain recording unit on the basis of said second error-correcting code corresponding to said data of said certain recording unit if errors are not detected by said error-detecting code.

17. A data reproducing apparatus according to claim 12, wherein said recording medium is a read-only recording medium.

18. A data reproducing apparatus comprising:
identifying means for identifying a first recording medium with data of respective recording units recorded thereon, said data of respective recording units being generated by adding a first error-correcting code generated with respect to a series of data of a predetermined amount to data of said predetermined amount from which said first error-correcting code is generated and by adding a second error-correcting code generated with respect to the series of data of a predetermined amount to data of said predetermined amount other than said data of said predetermined amount from which said second error-correcting code is generated, and a second recording medium with data of respective recording units recorded thereon, said data of respective recording units of said second recording medium being generated by a first error-correcting code generated with respect to a series of data of a predetermined amount and by adding a second error-correcting code generated with respect to the series of data of said predetermined amount to data of said predetermined amount from which said second error-correcting code is generated;

reproducing means for reproducing data from said first and second recording mediums at said recording unit; and error-correcting means for detecting on the basis of said first error-correcting code contained in reproduced data of a certain recording unit whether or not errors can be detected and corrected, detecting and correcting said errors if said errors can be detected and corrected, generating erasure information on the basis of said second error-correcting code corresponding to said data of said certain recording unit reproduced from the recording unit which contains said second error-correcting code corresponding to said data of said certain recording unit, and erasing and correcting said data of said certain recording unit by use of said erasure information and said first error-correcting code if said errors cannot be detected and corrected when said identifying means identifies a recording medium as said first recording medium, and for detecting on the basis of said first error-correcting code contained in reproduced data of recording unit whether or not errors can be detected and corrected, detecting and correcting said errors if said errors can be detected and corrected, generating erasure information on the basis of said second error-correcting code contained in said data of said certain recording unit if said errors cannot be detected and corrected and erasing and correcting said data of said certain recording unit by use of said erasure information and said first error-correcting code if said identifying means identifies a recording medium as said second recording medium.

19. A recording medium for recording thereon data of respective recording units, said data of respective recording units being generated by adding a first error-correcting code generated with respect to a series of data of a predetermined amount and by adding a second error-correcting code generated with respect to a series of data of said predetermined amount to data of said predetermined amount other than data of said predetermined amount from which said second error-correcting code is generated.

20. A recording medium according to claim 19, wherein data of said recording unit which contains a second error-correcting code in relation to said first error-correcting code is recorded at a recording position next to a recording position at which said data of recording unit which contains said first error-correcting code concerning data of said predetermined amount is recorded.

21. A recording medium according to claim 20, wherein data of said recording unit formed by adding identification data as data of said predetermined amount are recorded with respect to said second error-correcting code concerning last data of said predetermined amount in a series of data of said predetermined amount.

22. A recording medium according to claim 20, wherein identification data is added to leading data of said predetermined amount in a series of data of said predetermined amount in place of said second error-correcting code.

23. A recording medium according to claim 19, wherein said data of said respective recording units contain an error-check code concerning data of said predetermined amount contained in its recording unit.

24. A recording medium according to claim 19, wherein said recording medium is formed of a read-only recording medium.

* * * * *